(12) United States Patent
Oles et al.

(10) Patent No.: US 12,435,907 B2
(45) Date of Patent: Oct. 7, 2025

(54) TUBULAR RECEIVER FOR HEATING PARTICLES WITH SOLAR ENERGY

(71) Applicant: Heliogen Holdings, Inc., Pasadena, CA (US)

(72) Inventors: Andrew Stephen Oles, Baltimore, MD (US); Apurba Kumar Das, Katy, TX (US); Chiranjeev Singh Kalra, Irvine, CA (US); Gary Thomas Pashko, Ludlow, MA (US)

(73) Assignee: HELIOGEN HOLDINGS, INC., Pasadena, CA (US)

( * ) Notice: Subject to any disclaimer, the term of this patent is extended or adjusted under 35 U.S.C. 154(b) by 390 days.

(21) Appl. No.: 17/820,052

(22) Filed: Aug. 16, 2022

(65) Prior Publication Data

US 2023/0058254 A1    Feb. 23, 2023

Related U.S. Application Data

(60) Provisional application No. 63/235,067, filed on Aug. 19, 2021.

(51) Int. Cl.
*F24S 80/20*        (2018.01)
*F24S 20/20*        (2018.01)
(Continued)

(52) U.S. Cl.
CPC .............. *F24S 80/20* (2018.05); *F24S 20/20* (2018.05); *F24S 20/30* (2018.05); *F24S 10/72* (2018.05); *F24S 2020/23* (2018.05); *Y02E 10/44* (2013.01)

(58) Field of Classification Search
CPC .. F24S 20/30; F24S 20/20; F24S 80/20; F24S 10/72; F24S 2020/23; F24S 10/45; F24S 90/00; Y02E 10/44; Y02E 10/40
See application file for complete search history.

(56) References Cited

U.S. PATENT DOCUMENTS 1,989,999 A * 2/1935 Niederle ................. F24S 20/20
                                                  126/573
2,872,915 A * 2/1959 Bowen ................... F24S 30/425
                                                  126/573
(Continued)

FOREIGN PATENT DOCUMENTS

CN       103500277 A      1/2014
CN       212902070 U      6/2021
(Continued)

OTHER PUBLICATIONS

EP-0005665-A1, English Language Machine Translation (Year: 1979).*

(Continued)

*Primary Examiner* — Wesley G Harris
(74) *Attorney, Agent, or Firm* — Knobbe, Martens, Olson & Bear, LLP

(57) ABSTRACT

A particle receiver includes an inlet, an outlet and multiple tubes rotatably coupled to the inlet and the outlet. The tubes receive particles via the inlet, the particles passing along a passageway of each of the tubes to the outlet. The tubes receive a solar flux as they rotate to heat the particles passing through the tubes. A heat transfer coefficient of the particles is increased by increased mixing via air flowing in the tubes, fins used to mix the particles or via channels via which the particles pass through that increase turnover and mixing of the particles.

21 Claims, 17 Drawing Sheets

(51) Int. Cl.
*F24S 20/30* (2018.01)
*F24S 10/70* (2018.01)

(56) References Cited

U.S. PATENT DOCUMENTS

| | | | | |
|---|---|---|---|---|
| 4,055,948 | A | * | 11/1977 | Kraus ................ F03G 6/067 |
| | | | | 324/624 |
| 4,161,170 | A | | 7/1979 | Nicolaisen |
| 4,232,656 | A | | 11/1980 | Teagan |
| 4,333,447 | A | * | 6/1982 | Lemrow ............... F24S 10/45 |
| | | | | 126/684 |
| 4,362,895 | A | | 12/1982 | Gupta |
| 4,372,292 | A | | 2/1983 | Ort |
| 4,474,170 | A | * | 10/1984 | McConnell .......... F24S 70/225 |
| | | | | 427/236 |
| 4,683,872 | A | | 8/1987 | Fricker |
| 4,706,651 | A | * | 11/1987 | Yudow ................ F24S 23/10 |
| | | | | 126/681 |
| 4,727,930 | A | * | 3/1988 | Bruckner ............... F02C 6/14 |
| | | | | 165/84 |
| 4,777,934 | A | * | 10/1988 | De Laquil, III ....... F24S 20/20 |
| | | | | 126/643 |
| 4,993,235 | A | | 2/1991 | Frantl |
| 5,505,917 | A | * | 4/1996 | Collier, Jr. ............. C02F 1/02 |
| | | | | 126/684 |
| 5,950,618 | A | * | 9/1999 | Wu ..................... F24S 10/45 |
| | | | | 126/596 |
| 7,690,377 | B2 | | 4/2010 | Goldman et al. |
| 7,906,750 | B2 | | 3/2011 | Hickerson |
| 8,063,349 | B2 | | 11/2011 | Huss et al. |
| 8,490,618 | B2 | | 7/2013 | Kroizer et al. |
| 8,739,775 | B2 | | 6/2014 | Kroyzer et al. |
| 9,010,317 | B1 | | 4/2015 | Gross |
| 9,103,719 | B1 | | 8/2015 | Ho |
| 9,347,685 | B2 | | 5/2016 | Plotkin et al. |
| 9,476,611 | B1 | * | 10/2016 | Shbeeb ................ F24S 50/20 |
| 9,482,583 | B1 | | 11/2016 | Zavodny |
| 9,575,480 | B1 | | 2/2017 | Azarchs |
| 9,766,122 | B2 | | 9/2017 | Cothuru |
| 9,784,474 | B2 | | 10/2017 | Kretzschmar et al. |
| 10,359,215 | B2 | | 7/2019 | Baker |
| 10,508,834 | B1 | * | 12/2019 | Ho ........................ F24S 21/00 |
| 2007/0221208 | A1 | | 9/2007 | Goldman |
| 2008/0236568 | A1 | | 10/2008 | Hickerson |
| 2009/0173338 | A1 | * | 7/2009 | Chih ..................... F24S 10/45 |
| | | | | 126/683 |
| 2009/0229264 | A1 | | 9/2009 | Gilon |
| 2010/0224232 | A1 | | 9/2010 | Cummings |
| 2010/0236239 | A1 | | 9/2010 | Kroizer et al. |
| 2010/0300510 | A1 | | 12/2010 | Goldman et al. |
| 2011/0120448 | A1 | | 5/2011 | Fitch |
| 2012/0174909 | A1 | | 7/2012 | Koningstein |
| 2013/0021471 | A1 | | 1/2013 | Waterhouse |
| 2013/0257056 | A1 | * | 10/2013 | Ma ...................... F28D 20/0056 |
| | | | | 126/714 |
| 2014/0026885 | A1 | | 1/2014 | Also |
| 2014/0083413 | A1 | | 3/2014 | Bibi |
| 2017/0198942 | A1 | | 7/2017 | Baker |
| 2019/0144303 | A1 | * | 5/2019 | Woods ................. F24S 23/71 |
| | | | | 44/552 |
| 2019/0158011 | A1 | | 5/2019 | West |
| 2022/0260284 | A1 | | 8/2022 | Schell et al. |

FOREIGN PATENT DOCUMENTS

| | | | | |
|---|---|---|---|---|
| EP | 0005665 A1 | * | 11/1979 | ............ F24J 3/02 |
| EP | 2975263 A1 | * | 1/2016 | ............ F02C 1/05 |
| EP | 3 434 360 A1 | | 1/2019 | |
| KR | 10-2009-0073069 A | | 7/2009 | |
| WO | WO-2010073022 A2 | * | 7/2010 | ............ F03G 6/065 |
| WO | WO-2012125748 A2 | | 9/2012 | |
| WO | WO-2017064339 A1 | | 4/2017 | |
| WO | WO-2020165608 A1 | * | 8/2020 | ............ F24S 20/20 |

OTHER PUBLICATIONS

Freeman et al. "Closed Loop Control System for a Heliostat Field" 2015 IEEE, 6 Pages.

International Search Report and Written Opinion dated Nov. 25, 2022, received in International Patent Application No. PCT/US2022/075032, in 10 pages.

* cited by examiner

TUBULAR RECEIVER FOR HEATING PARTICLES WITH SOLAR ENERGY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure is directed to solar energy receiver, and more particularly to a tubular solar energy receiver for heating particles that pass through the receiver.

Description of the Related Art

Existing solar energy systems utilize solar panels to convert sunlight into electricity. However, existing solar energy systems have various drawbacks that make them inefficient and ineffective for capturing energy from the Sun and converting it to energy for use on an industrial and utility scale. One such drawback is the inability to use solar energy for industrial scale applications.

SUMMARY

In accordance with one aspect of the disclosure a particle receiver is provided. The particle receiver comprises an inlet, an outlet and a plurality of tubes rotatably coupled to the inlet and the outlet and configured to receive a plurality of particles via the inlet, the particles passing along a passageway of each of the tubes to the outlet, the particles dispensed via the outlet, the tubes configured to receive solar energy on an outer surface thereof to heat the particles passing through the tubes.

In accordance with another aspect of the disclosure a particle receiver is provided. The particle receiver comprises an inlet, an outlet and a plurality of tube assemblies, each tube assembly comprising an inner tube fixed to the inlet and to the outlet and an outer tube rotatably coupled to the inlet and the outlet and disposed about the inner tube, the tube assembly configured to receive a plurality of particles via the inlet, the particles passing along a passageway between the inner tube and the outer tube to the outlet, the particles dispensed via the outlet, the outer tube being made of metal and configured to receive solar energy on an outer surface thereof to heat the particles passing through the tube assembly.

DETAILED DESCRIPTION

FIGS. 1-4B show aspects of a receiver system 100 that receives particles and via which the particles are heated as they travel through the receiver system 100. In one implementation, the particles can have a size (e.g., diameter) of 10-1000 μm, such as 200-300 μm. The receiver system 100 can have one or more (e.g., multiple) tube assemblies 10 that extend between an inlet 20 of the system 100 and an outlet 30 of the system. The tube assemblies 10 can be arranged parallel to each other.

Figure 1:
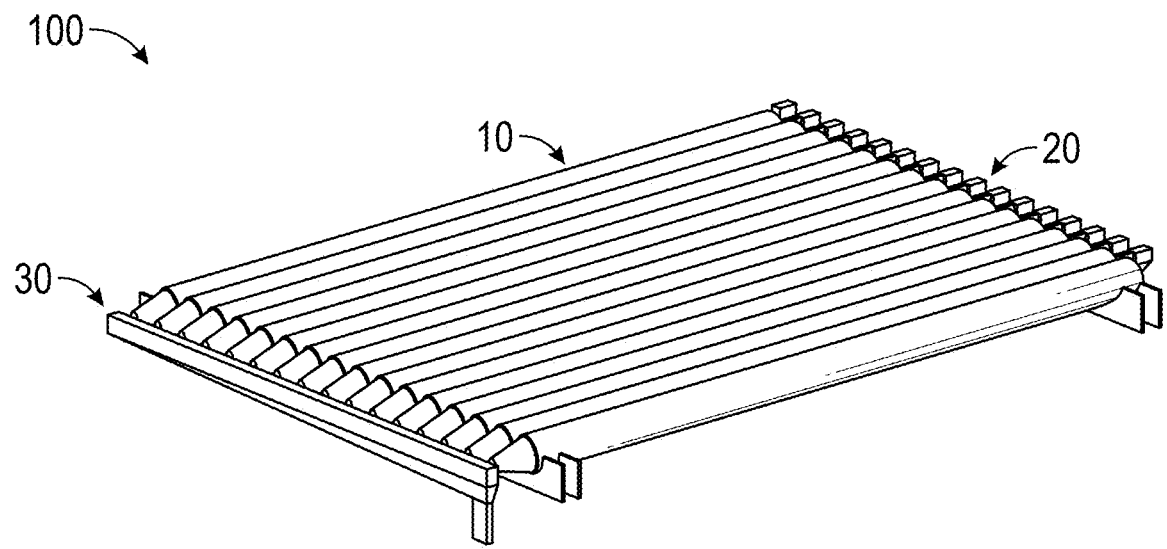
FIG. 1 is a schematic perspective view of a receiver system.
Figure 2:
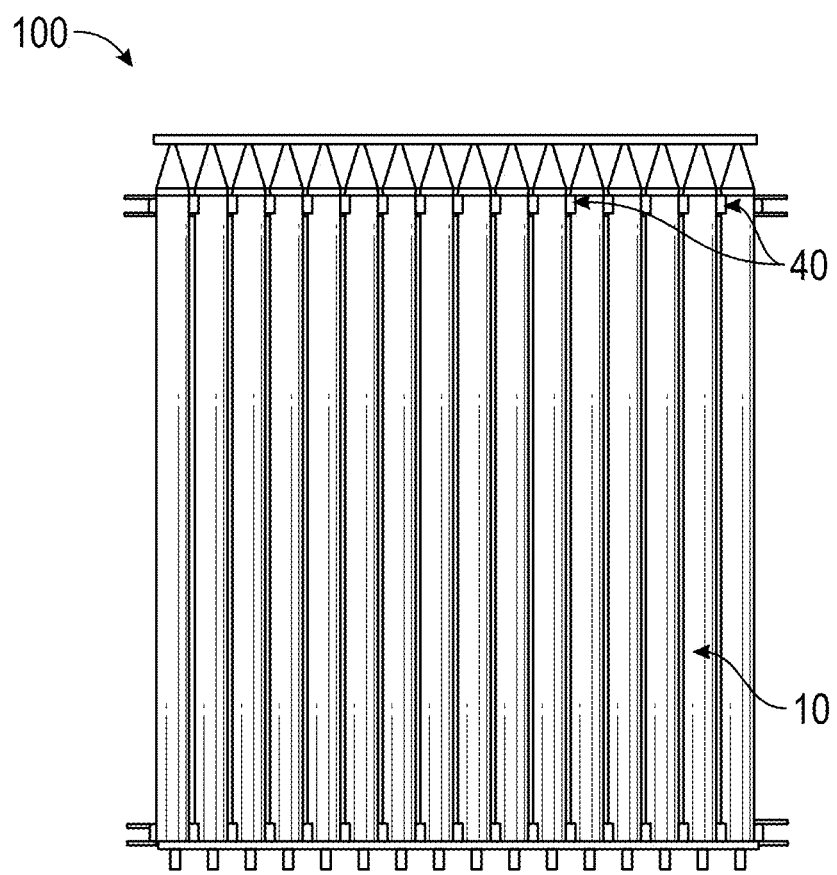
FIG. 2 is a schematic top planar view of the receiver system in FIG. 1.

As shown in FIG. 2, the tube assemblies 10 can be adjacent each other.

Figure 3:
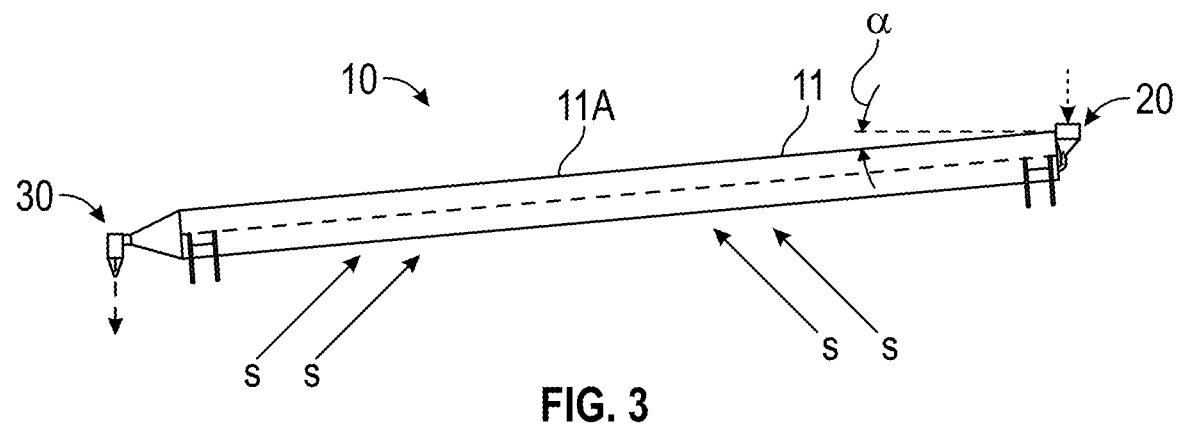
FIG. 3 is a schematic side view of a tube assembly of the receiver system of FIG. 1.

Each of the tube assemblies 10 can include a tube 11 and roller bearings 40 that rotatably couple the tube 11 to the inlet 20 and the outlet 30 to allow the tube 11 to rotate relative to the inlet 20 and the outlet 30. Advantageously, rotation of the tube 11 reduces thermal stresses on the tube 11 from the solar flux directed at the tube 11. In some implementations, the tubes 11 of the tube assemblies 10 can rotate at a speed of between about 30 revolutions per minute (rpm) and 200 rpm. With reference to FIG. 3, the outer surface 11A of the tubes 11 of the receiver system 100 is irradiated with a solar flux S (e.g., via reflected sunlight via a concentrated solar power system, as further discussed below), which heats the particles as they flow through the tubes 11, as further described below. Rotation of the tubes 11 while the particles flow therethrough advantageously increases mixing of the particles and the heat transfer coefficient of the particles. In one example, the tubes 11 are irradiated and heat transferred to the particles flowing through the tubes 11 to effect a chemical process (e.g., calcination) of the particles. The particles can enter the inlet 20 at a relatively lower temperature and pass from the tube 11 into the outlet 30 at a relatively higher temperature.

In one implementation, the tubes 11 of the tube assemblies 10 can have a length of between 10 and 15 meters (e.g., have a length of about 13 meters) and have an outer diameter of between 0.75 m and 1 m (e.g., have an outer diameter of about 0.9 m). In one implementation, the tubes 11 of the tube assemblies 10 can be angled downward between the inlet 20 and the outlet 30 relative to a horizontal plane so that the particles travel through the tubes 11 via (e.g., solely) a force of gravity (e.g., so that the inlet 20 or proximal end of the tube assemblies 10 is at a higher elevation than the outlet 30 or distal end of the tube assemblies 10). In one example, the tubes can be angled downward relative to a horizontal plane by an angle α of about 10 degrees. However, the angle α can be greater or less than 10 degrees (e.g., 5 degrees, 7 degrees, 15 degrees). The tube 11 can be made of metal. In one example, the tube 11 can be made of stainless steel. In another example, the tube 11 can be made of Inconel. In another example, the tube 11 can be made of a ceramic material (e.g., silicon carbide, alumina).

Figure 4A:
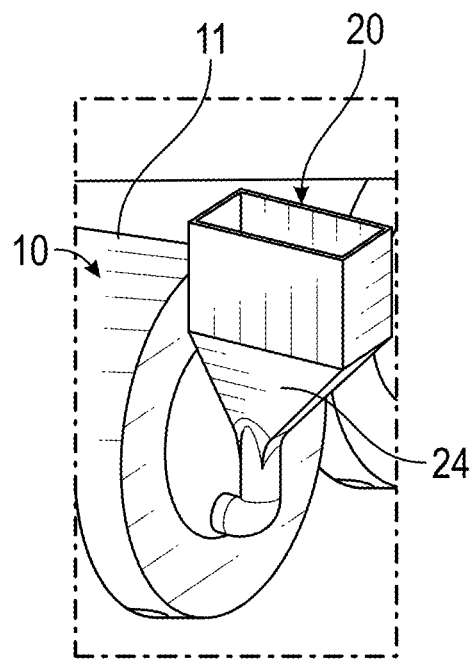
FIG. 4A is a schematic partial perspective view of an inlet to the tube assembly in FIG. 3.
Figure 4B:
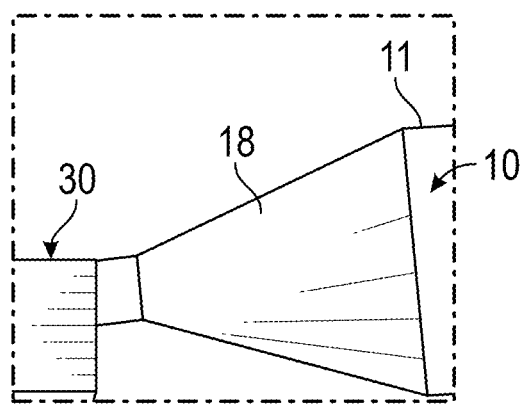
FIG. 4B is a schematic partial perspective view of an outlet to the tube assembly in FIG. 3.

FIGS. 4A-4B show one example of the inlet 20 and outlet 30 for a tube assembly 10 of the receiver system 100. The inlet 20 for a tube assembly 10 can have a funnel 24 to direct the particles into the tube 11 of the tube assembly 10. The outlet 30 can include a tapered or cone end 18 in communication with an end of the tube 11 of the tube assembly 10. In one implementation, the outlet 30 directs the irradiated (e.g., heated) particles to a collection bin into which the particles slip out of the tube 11 into the collection bin. In one implementation, the outlet 30 directs the particles to a thermal energy storage that can then be used for one or more industrial processes (e.g., generate electricity, generate steam, facilitate a chemical process, etc.).

Figure 5:
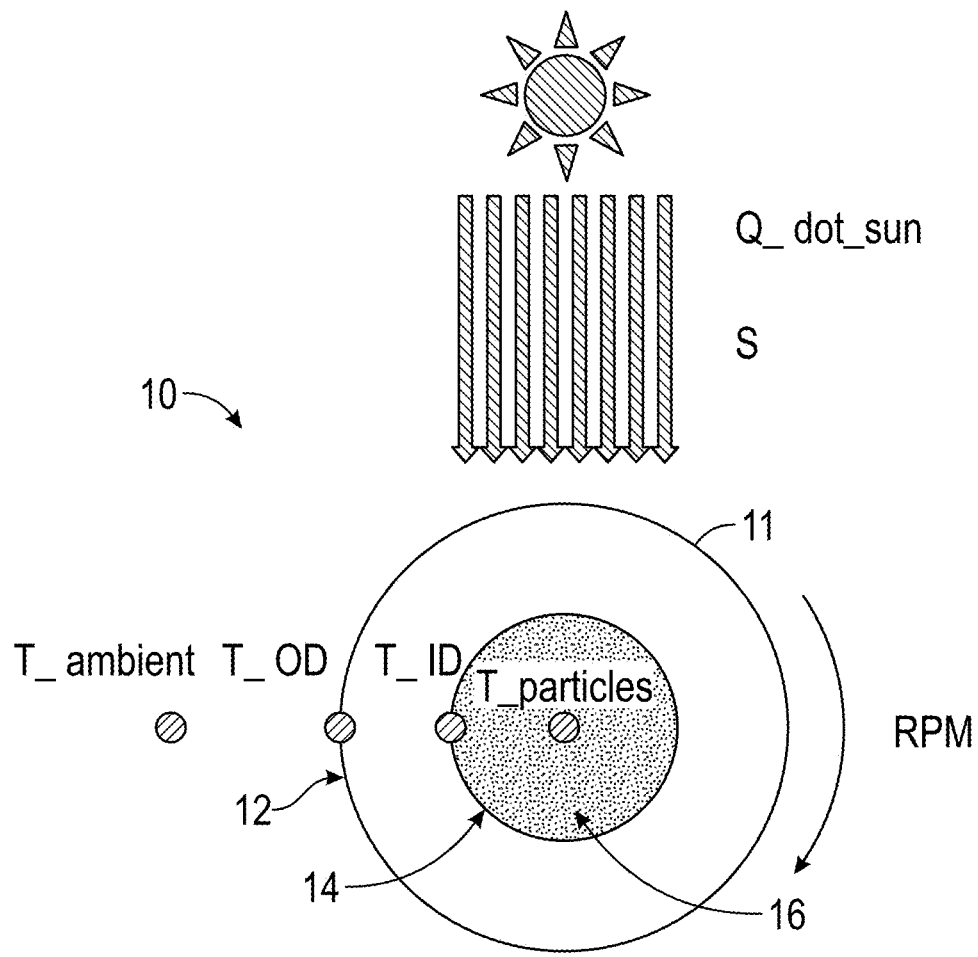
FIG. 5 is a schematic view of a tube assembly of the system in FIG. 1
Figure 6:
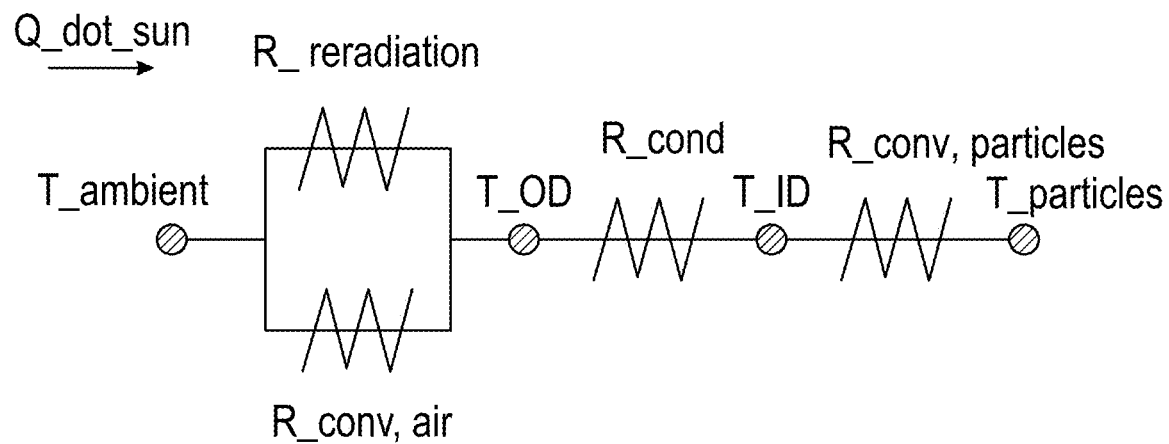
FIG. 6 is a diagram of a thermal resistance of a tube of the system in FIG. 1.

FIG. 5 shows a schematic of a tube 11, where the outer wall 12 of the tube 11 receives a solar flux S as it rotates. T_ambient is the ambient air temperature around the tube assemblies 10, T_OD is the temperature of the outer wall 12, T_ID is the temperature of the inner wall and T_particles is the temperature of the particles flowing through the tube assembly 10. FIG. 6 shows a thermal resistance diagram for the tube 11, illustrating four heat transfer processes that occur in the tube assemblies 10 of the receiver system 100. The solar flux S is directed to the outer wall 12 of the tube 11 of the tube assembly 10. Reradiation from the outer wall 12 and convection of air acting on the outer wall 12 draw some of the heat away from the outer wall 12. The remaining heat travels from the outer wall 12 to the inner wall 14 via conduction. Convection between the inner wall 14 and the particles in a flowpath 16 (e.g., passageway) heats the particles flowing through the flowpath 16. The temperature difference (ΔT) between the ambient temperature (T_ambient) and the particle temperature (T_particles) is provided by the following formulas, where $Q_{sun}$ is the solar heat flux:

$$\Delta T = Q_{sun} * R_{thermal}$$

$$R_{thermal} = R_{reradiation} + R_{convection,\ air} + R_{conduction} + R_{convection,\ particles}$$

FIGS. 7-13 show a schematic view of a receiver system 100A (the "system"). Some of the features of the receiver system 100A are similar to features of the receiver system 100 in FIGS. 1-4B. Thus, reference numerals used to designate the various components of the receiver system 100A are identical to those used for identifying the corresponding components of the receiver system 100 in FIGS. 1-4B, except that an "A" has been added to the numerical identifier. Therefore, the structure and description for the various features of the receiver system 100 and how it's operated and controlled in FIGS. 1-4B are understood to also apply to the corresponding features of the receiver system 100A in FIGS. 7-13, except as described below.

Figure 7:
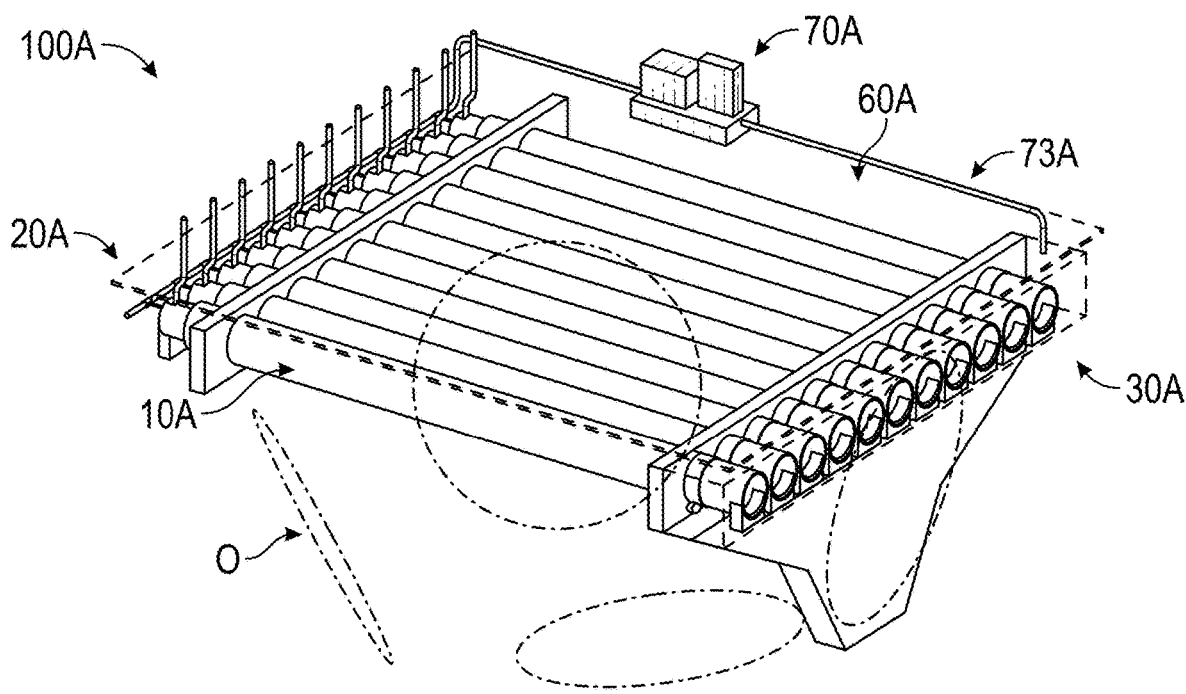
FIG. 7 is a schematic perspective view of a receiver system.

The receiver system 100A differs from the receiver system 100 in that it includes an air system 70A that flows air through the tube assemblies 10A to fluidize the particles and effect or facilitate flow of the particles along the tube assemblies 10A between the inlet 20A and the outlet 30A of the tube assemblies 10A. The receiver system 100A can include a cover, ceiling or insulation layer 60A disposed over (e.g., spaced above the) tube assemblies 10A. FIG. 7 also shows one arrangement of receiver apertures O in a housing (not shown) via which solar flux is directed to the tube assemblies 10A (e.g., to an underside of the tube assemblies 10A), for example to provide a super-positional solar flux on the underside of the tube assemblies 10A. However, fewer (e.g., one) or more receiver apertures O can be used and/or a different arrangement of receiver apertures O can be used. The receiver system 100A provides an indirectly-irradiated solar receiver.

Figure 8A:
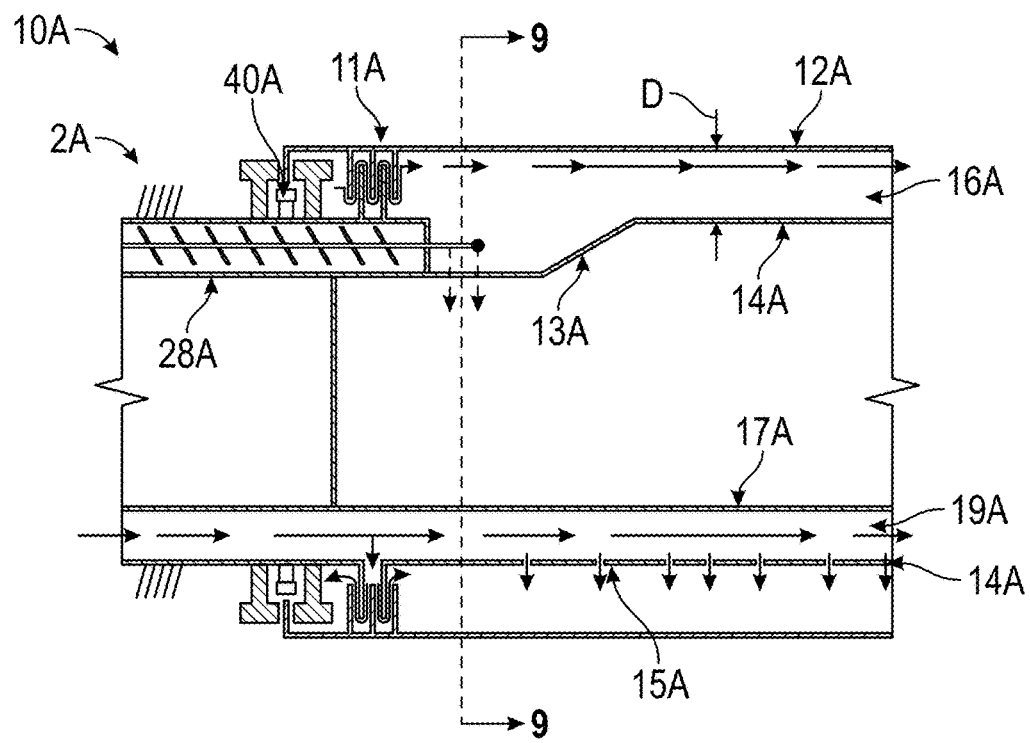
FIG. 8A is a schematic cross-sectional view of an inlet to a tube of the receiver system in FIG. 7.
Figure 9:
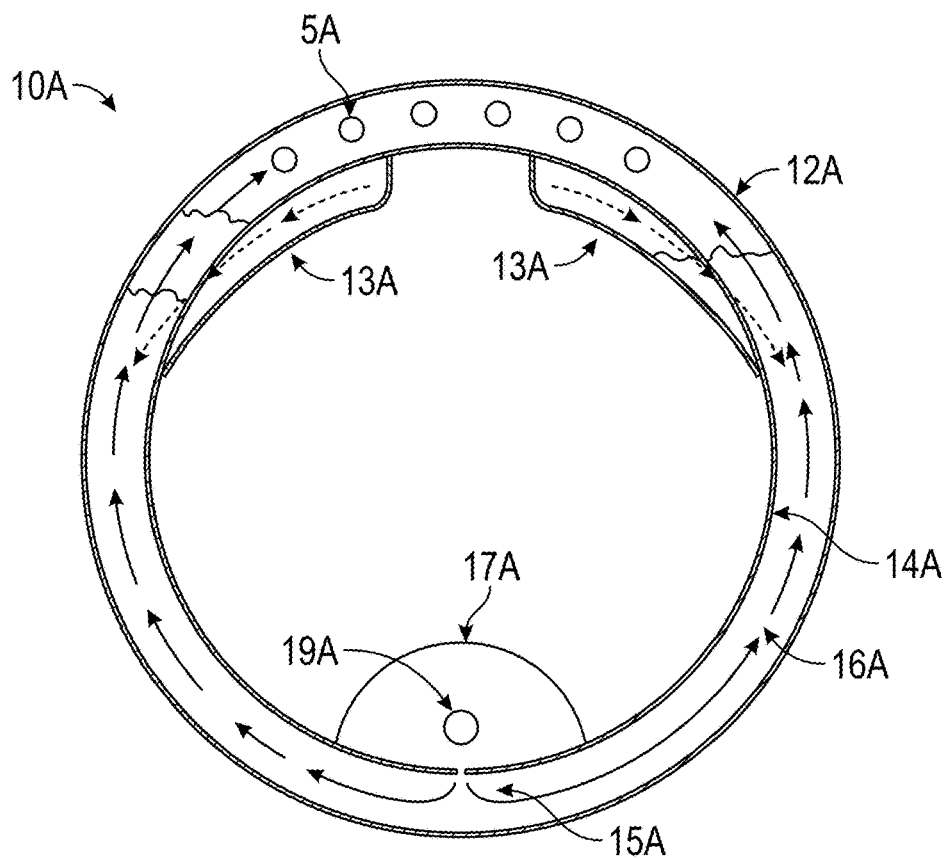
FIG. 9 is a schematic cross-sectional view of a tube assembly of the system of FIG. 7 along a plane transverse to a longitudinal axis of the tube assembly.

FIG. 8A shows a lengthwise cross-section of proximal portion 2A of one tube assembly 10A of the receiver system 100A (near the inlet 20A), such as along a centerline of the tube assembly 10A. FIG. 9 shows a cross-section of the tube assembly 10A along line 9-9 in FIG. 8A. Each tube assembly 10A in the receiver system 10 can have an outer tube 12A and an inner tube 14A, where the outer tube 12A is coupled to one or more roller bearings 40A to allow the outer tube 12A to rotate relative to the inner tube 14A. Advantageously, rotation of the outer tube 12A reduces thermal stresses on the outer tube 12A and tube assembly 10A from the solar flux directed at the outer tube 12A. In one example, the inner tube 14A is fixed (e.g., coupled to or supported by a frame) and the outer tube 12A moves relative to the inner tube 14A.

In one implementation, the inner tube 14A can be made of a different material than the outer tube 12A. In one example the inner tube 14A can be made of stainless steel and the outer tube 12A can be made of Inconel or a ceramic material (e.g., silicon carbide, alumina). In operation, when the outer tube 12A is made of stainless steel, the particles passing through the tube assembly 10A can reach a temperature of up to 450-500° C. Alternatively, when the outer tube 12A is made of Inconel, the particles passing through the tube assembly 10A can reach a temperature of up to 650-750° C. In another example, when the outer tube 12A is made of silicon carbide or alumina, the particles passing through the tube assembly 10A can reach a temperature over 1000° C.

The inner tube 14A has an outer diameter and the outer tube 12A has an inner diameter that define an annulus 16A (e.g., annular gap) therebetween with a gap size (e.g., height) D. Advantageously, the gap size D can allow the particles in the annulus 16A to be close to the wall of the outer tube 12A that is irradiated, and therefore facilitate heat transfer to the particles. In one example, the gap size or height D between the inner tube 14A and the outer tube 12A can be about 2-3 cm. During operation, as further discussed below, the particles can flow through the annulus 16A (e.g., passageway, flowpath) between the inner tube 14A and the outer tube 12A. The particles are delivered into the annulus 16A via a conveyor 28A (e.g., a screw conveyor) that transports the particles from the inlet 20A to the tube assembly 10A and one or more ramps 13A that direct the particles downward in the annulus 16A (e.g., toward a lower side of the annulus 16A). In the illustrated implementation, the conveyor 28A extends along an axis parallel to a central axis of the tube assembly 10A. In one implementation, the inner tube 14A can be hollow (e.g., a central portion of the inner tube 14A is open). With continued reference to FIG. 8A, a seal 11A (e.g., a brush seal, a labyrinth seal) can be provided between the outer tube 12A and the conveyor 28A to inhibit (e.g., prevent) flow of the particles out of the proximal end 2A of the tube assembly 10A. Advantageously, the particles are fed into the outer annulus via a conveyor 28A running through the inner tube 14A, which allows a simple particle seal on the cold-side of the tube assembly 10A to isolate the rotational bearings 40A from the particle flows.

A gas (e.g., air) 19A can be injected into the inner tube 14A (as further discussed below) through a passage 17A (defined by a wall spaced radially inward of the wall of the inner tube 14A), and passes into the annulus 16A through openings 15A in a wall portion of the inner tube 14A, after which the air flows toward a top of the annulus 16A (see FIG. 9) and fluidizes or mixes with the particles flowing downward along the annulus 16A (see FIG. 9), thereby increasing the heat transfer coefficient of the particles. The air provides bubbling flow of the particles, to increase the mixing of the particles in the annulus 16A and increase their heat transfer coefficient with low flow rates (and therefore parasitic loads). Once the air flow reaches the top of the annulus 16A it flows along the top of the annulus 5A toward the outlet 30A of the tube assembly 10A. In this implementation, both the rotation of the outer tube 12A and the injection of air 19A (as described above) cause mixing of the particles and advantageously increase the heat transfer coefficient of the particles, with the spinning of the outer tube 12A moving at least some of the particles toward the top of the annulus 16A (shown in FIG. 9). In another implementation, the outer tube 12A does not rotate relative to the inner tube 14A and the injection of air is the sole mode of mixing the particles (e.g., of increasing the heat transfer coefficient of the particles. In one implementation, the gas (e.g., air) 19A can be a reactant stream that effects a chemical process (e.g., calcination) of the particles as they flow through the tube assembly 10A. In some implementations, the tube assemblies 10A extend horizontally (e.g., not at an angle relative to a horizontal plane). In another implementation, the tube assemblies 10A can extend at an angle relative to a horizontal plane, similar to the angled arrangement of the tube assemblies 10 in FIG. 3.

Figure 8B:
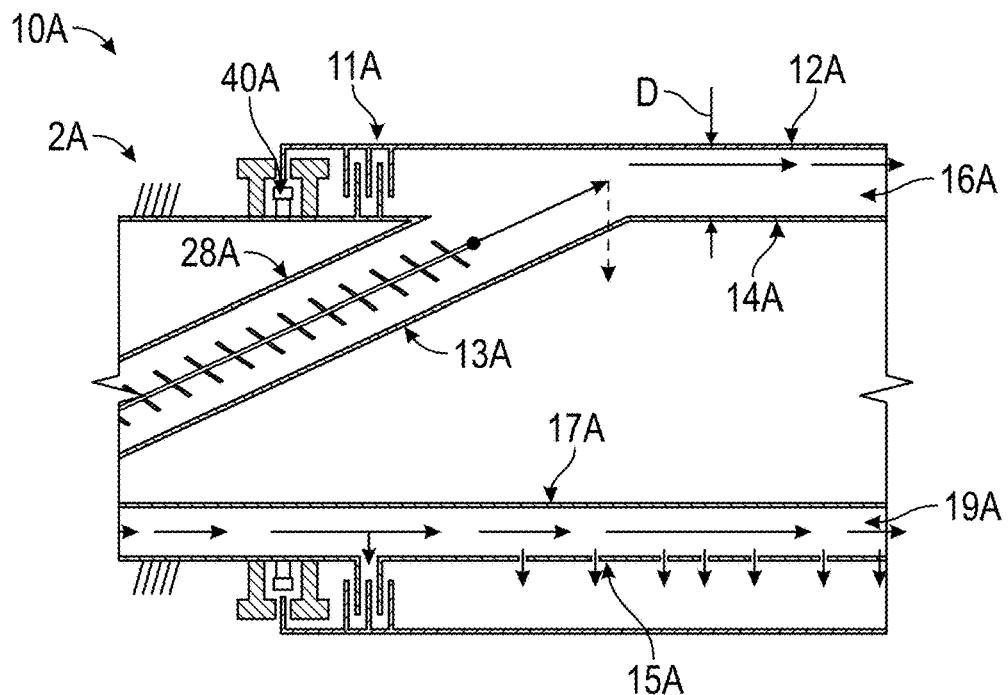
FIG. 8B is a schematic cross-sectional view of another implementation of an inlet to a tube of the receiver system in FIG. 7.

FIG. 8B shows an alternate lengthwise cross-section of proximal portion 2A of one tube assembly 10A of the receiver system 100A (near the inlet 20A), such as along a centerline of the tube assembly 10A. The tube assembly 10A in FIG. 8B differs from the tube assembly 10A in FIG. 8A only in that the conveyor 28B (e.g., screw conveyor) extends at an angle (a non-parallel angle) relative to a centerline of the tube assembly 10A).

Figure 10:
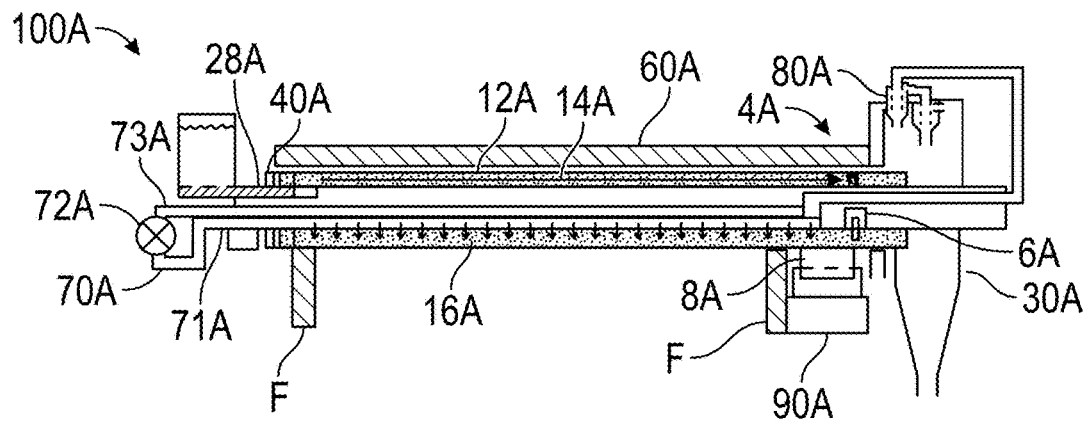
FIG. 10 is a schematic cross-sectional side view of a tube assembly of the system of FIG. 7 along a length of the tube assembly.

FIG. 10 shows a lengthwise cross-section of one tube assembly 10A of the receiver system 100A. The air system 70A includes a pump 72A that recirculates air 19A via an inlet line 71A and a return line 73A, where the air flows through the return line 73A at low pressure and is delivered by the pump 72a to the inlet line 71A at high pressure. As shown in FIG. 7, in one example, the return line 73A can be a single return line (e.g., that extends between headers at the outlet 30A and at the inlet 20A of the receiver system 100A) for all of the tube assemblies 10A of the receiver system 100A, and each tube assembly 10A can have a separate inlet line 71A. The tube assemblies 10A are supported by a frame F. In one example, the tube assembly 10A has a gate valve 6A operable to allow particles to exit the tube assembly 10A into the outlet 30A, as further discussed below. In one example, once the air exits the tube assembly 10A, it can pass through a cyclone separator 80A (e.g., to separate particles from the air), and the air can be directed to the pump 72A via the return line 73A. In one example, the distal portion 4A of the tube assemblies 10A can be supported on rollers 8A, which are supported by the frame F (e.g., by a beam 90A of the frame F). By flowing this recovered air back through the tube assembly 10A via the return line 73A, the air can be recuperated before being re-compressed and cycled again.

Figure 11:
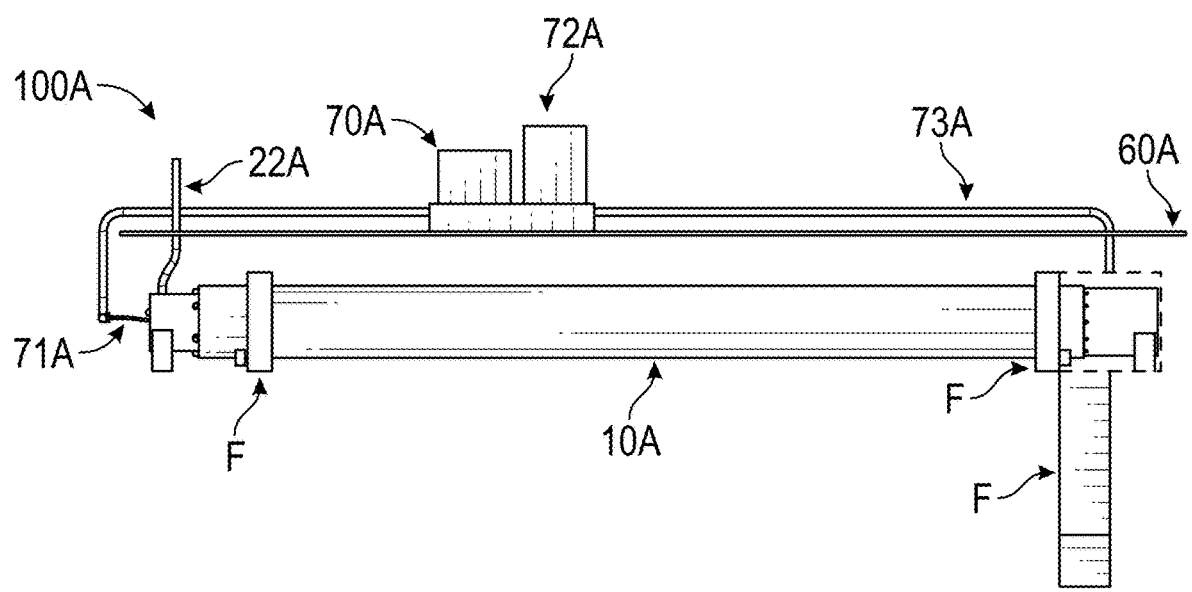
FIG. 11 is a schematic side view of a tube assembly of the system of FIG. 7.
Figure 12:
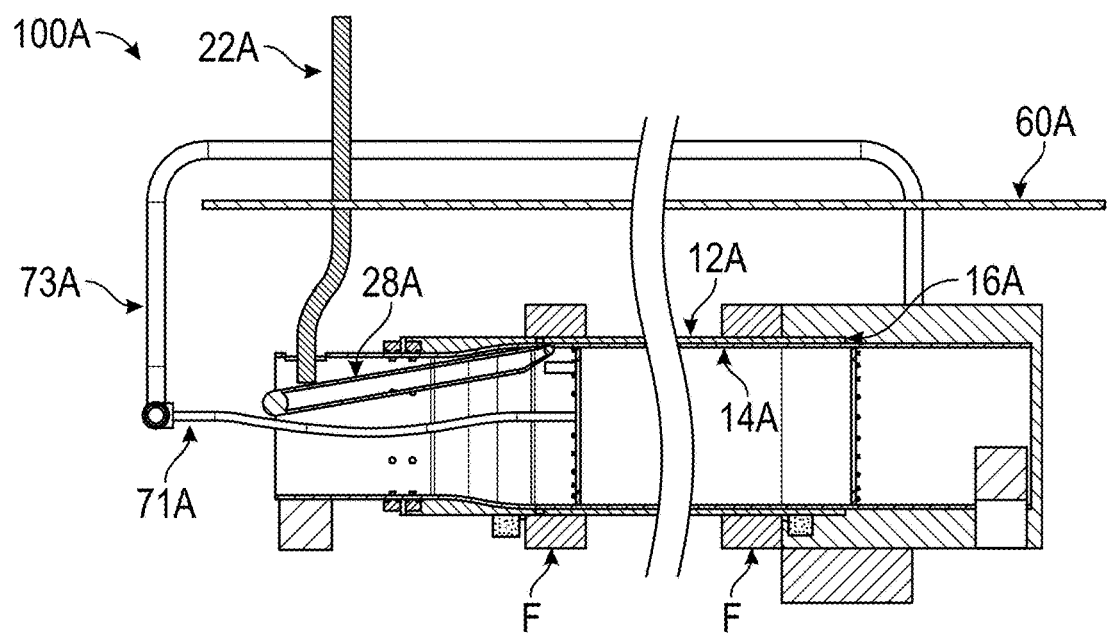
FIG. 12 is a schematic cross-sectional view of an inlet end of a tube assembly of the system of FIG. 7 along a length direction of the tube assembly.

With reference to FIGS. 11-12, the particles can be delivered to the conveyor 28A via a delivery line 22A or chute. In FIG. 12, the conveyor 28A is a belt conveyor.

Figure 13:
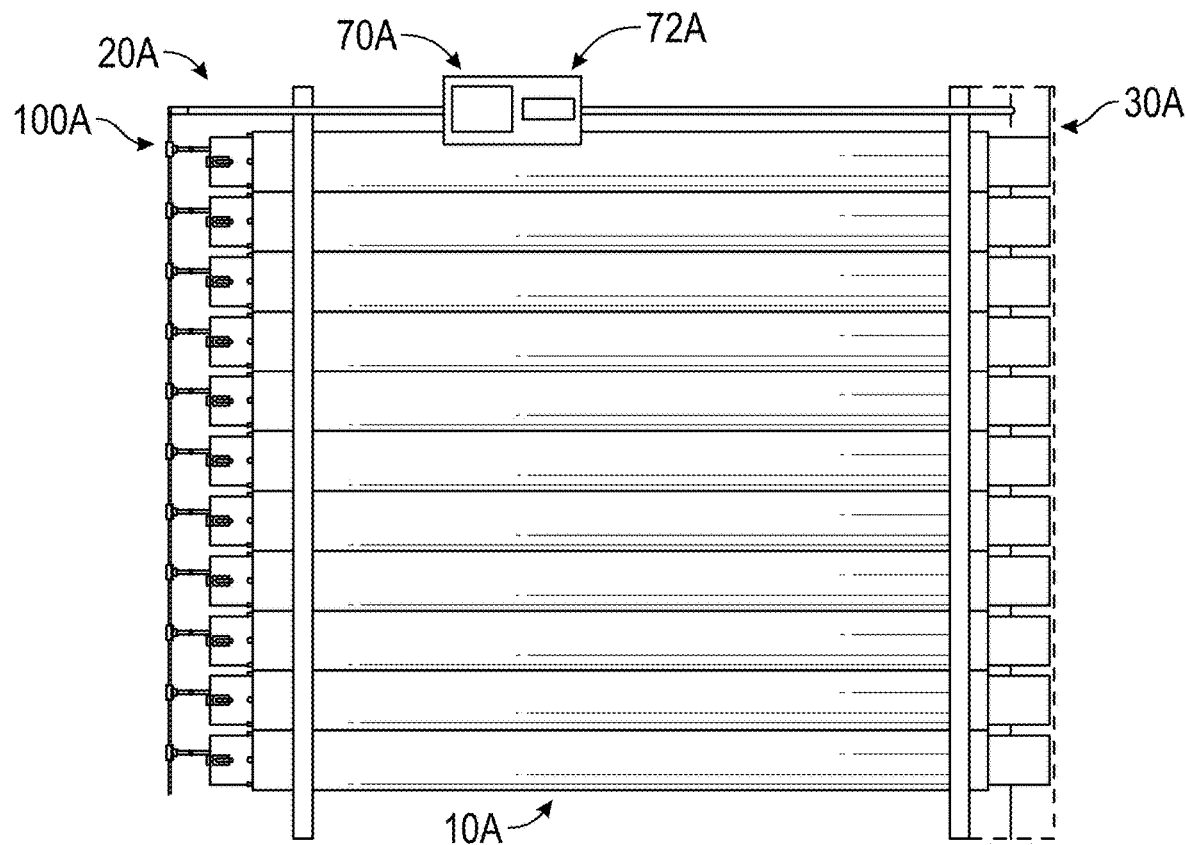
FIG. 13 is a schematic top view of the receiver system in FIG. 7.
Figure 13A:
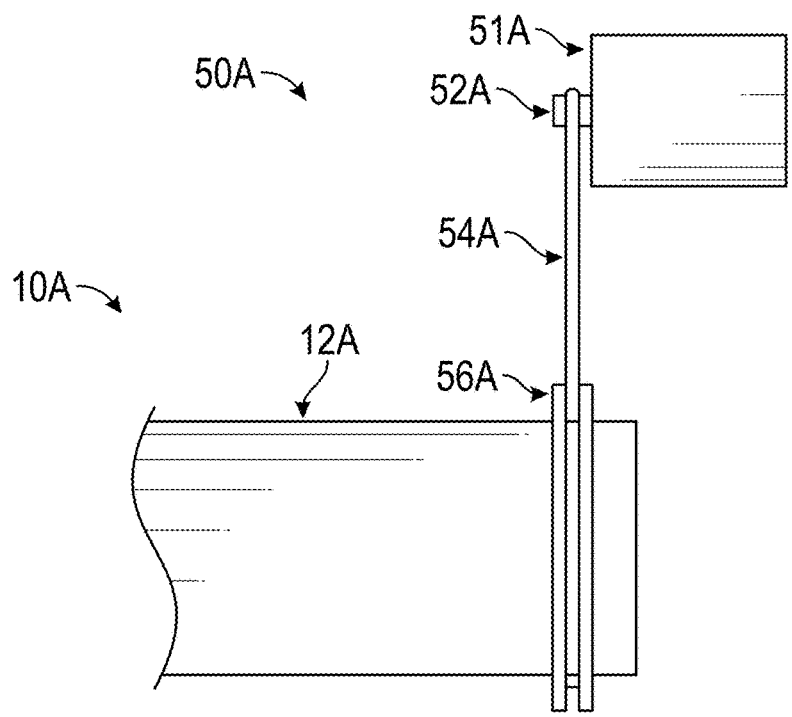
FIG. 13A is a schematic side view of a portion of a tube assembly of the receiver system of FIG. 7.

FIG. 13A shows a schematic side view of a portion (e.g., distal portion or outlet end) of a tube assembly 10A of the receiver system 100A, illustrating a drive system 50A for rotating the outer tube 12A of the tube assembly 10A. The drive system 50A includes a motor 51A (e.g., electric motor) with an output shaft 52A. A belt or chain 54A (e.g., a closed belt or chain) is coupled to (e.g., extends at least partially around) the output shaft 52A and extends around (e.g., extends at least partially around) the outer tube 12A. In one example, the belt or chain 54A can extend within a slot or channel 56A on an outer surface of the outer tube 12A. In operation, the electric motor 51A is operated to rotate the output shaft 52A, which causes the belt or chain 54A to move, which in turn causes the outer tube 12A to rotate (e.g., in the same direction as the output shaft 52A).

Figure 13B:
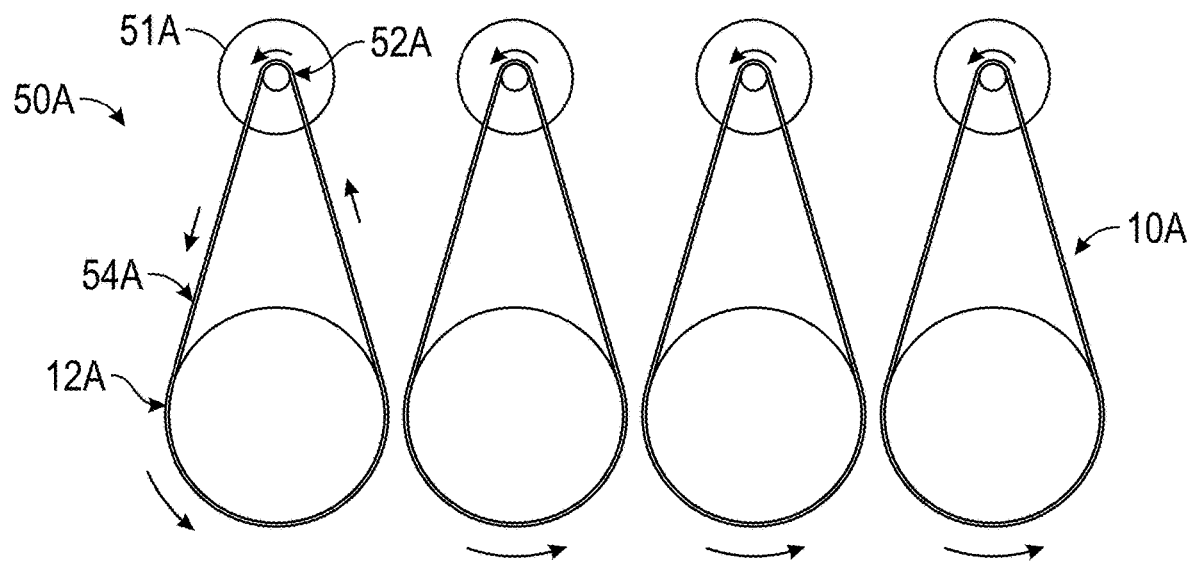
FIG. 13B is a schematic end view of a portion of the receiver system of FIG. 7 showing one implementation of a drive system.

FIG. 13B shows a schematic end view (e.g., distal or outlet end) of a portion of the receiver system 100A showing one example of the drive system 50A and tube assemblies 10A. In one example, the end view in FIG. 13B coincides with the side view in FIG. 13A. In the illustrated example, the drive system 50A includes a separate motor 51A, outlet shaft 52A and belt or chain 54A for each tube assembly 10A. As shown in FIG. 13B, each belt or chain 54A can extend over one outer tube 12A, and the outer tube 12A is rotated via its respective belt or chain 54A and electric motor 51A. In the illustrated view, the slot or channel 56A is excluded.

Figure 13C:
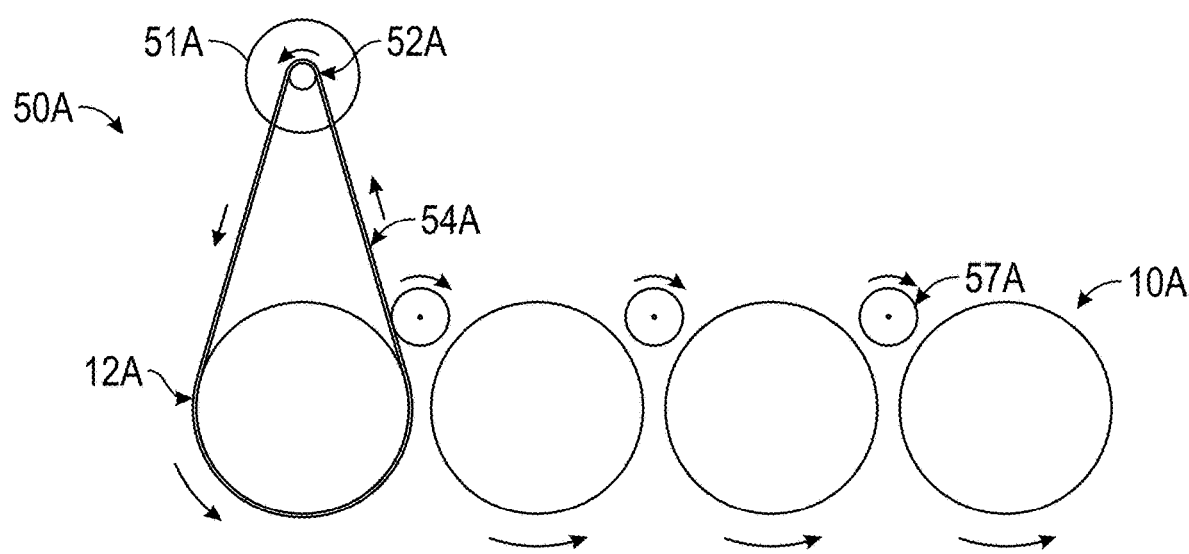
FIG. 13C is a schematic end view of a portion of the receiver system of FIG. 7 showing another implementation of a drive system.

FIG. 13C shows a schematic end view (e.g., distal or outlet end) of a portion of the receiver system 100A showing another example of the drive system 50A and tube assemblies 10A. In one example, the end view in FIG. 13C coincides with the side view in FIG. 13A. In the illustrated example, the drive system 50A includes a single motor 51A with its output shaft 52A, and a single belt or chain 54A that effect rotation of the outer tube 12A of all tube assemblies 10A of the receiver system 100A. As shown in FIG. 13C, in one example, gears 57A can be movably coupled to outer tubes 12A of adjacent tube assemblies 10A, so that rotation of one outer tube 12A is transferred to the adjacent outer tube 12A. In this example, the rotation of one outer tube 12A by engagement with the belt or chain 54A is transferred to the outer tubes 12A of the rest of the tube assemblies 10A in the receiver system 100A by the gears 57A. In other examples, mechanisms other than gears, such as belts, can intercouple two outer tubes 12A (e.g. of adjacent tube assemblies 10A) to transfer rotational motion.

Figure 14:
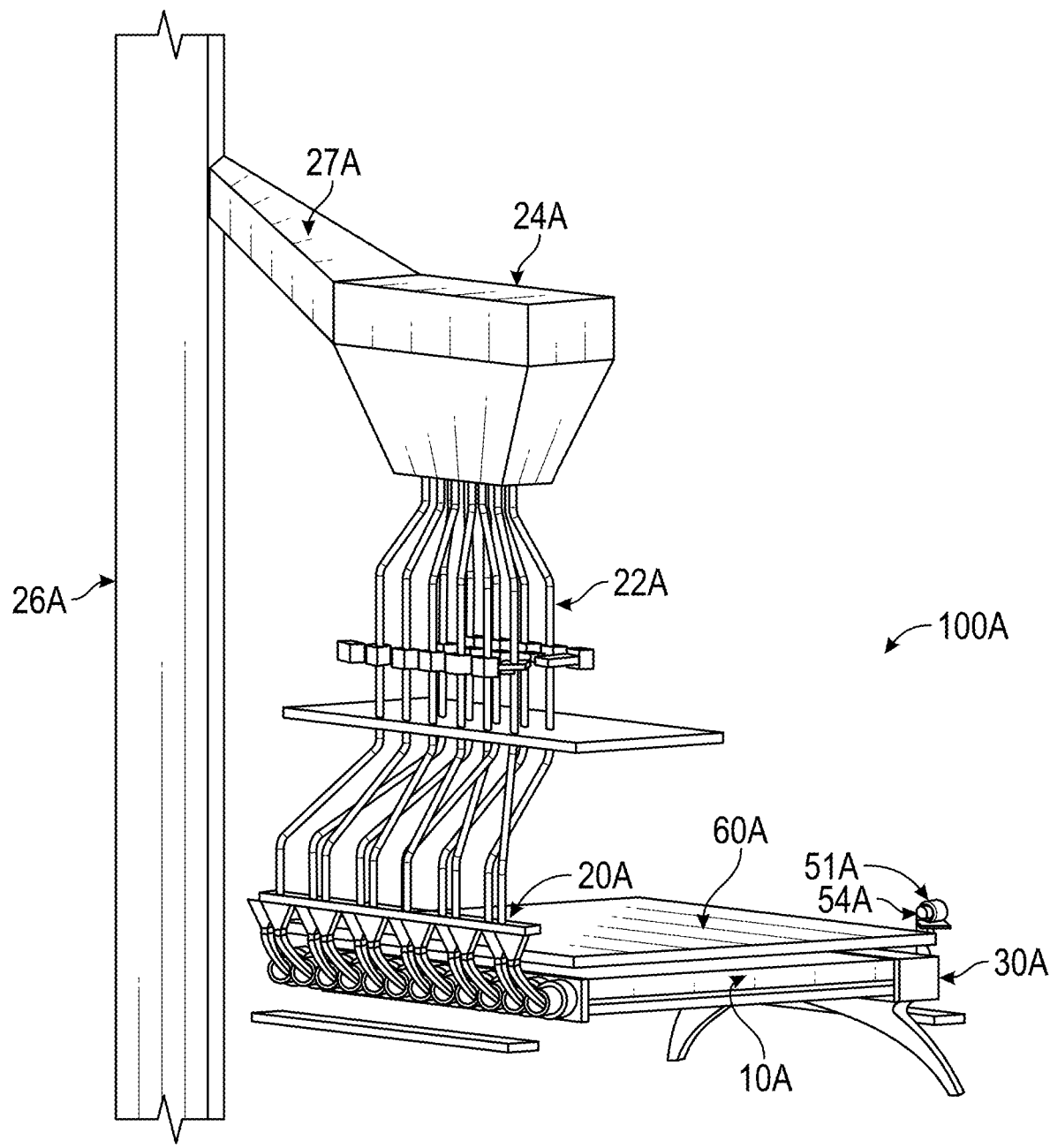
FIG. 14 is a schematic perspective view of the receiver system of FIG. 7.

FIG. 14 shows an example of a particle inlet assembly for the receiver system 100A. The particle inlet assembly can include an inlet chute 26A via which particles are delivered to a hopper 24A from which delivery lines 22A extend to the inlet 20A of the receiver system 100A. The inlet chute 26A can extend vertically and connect with the hopper 24A via a connecting chute 27A.

Figure 15:
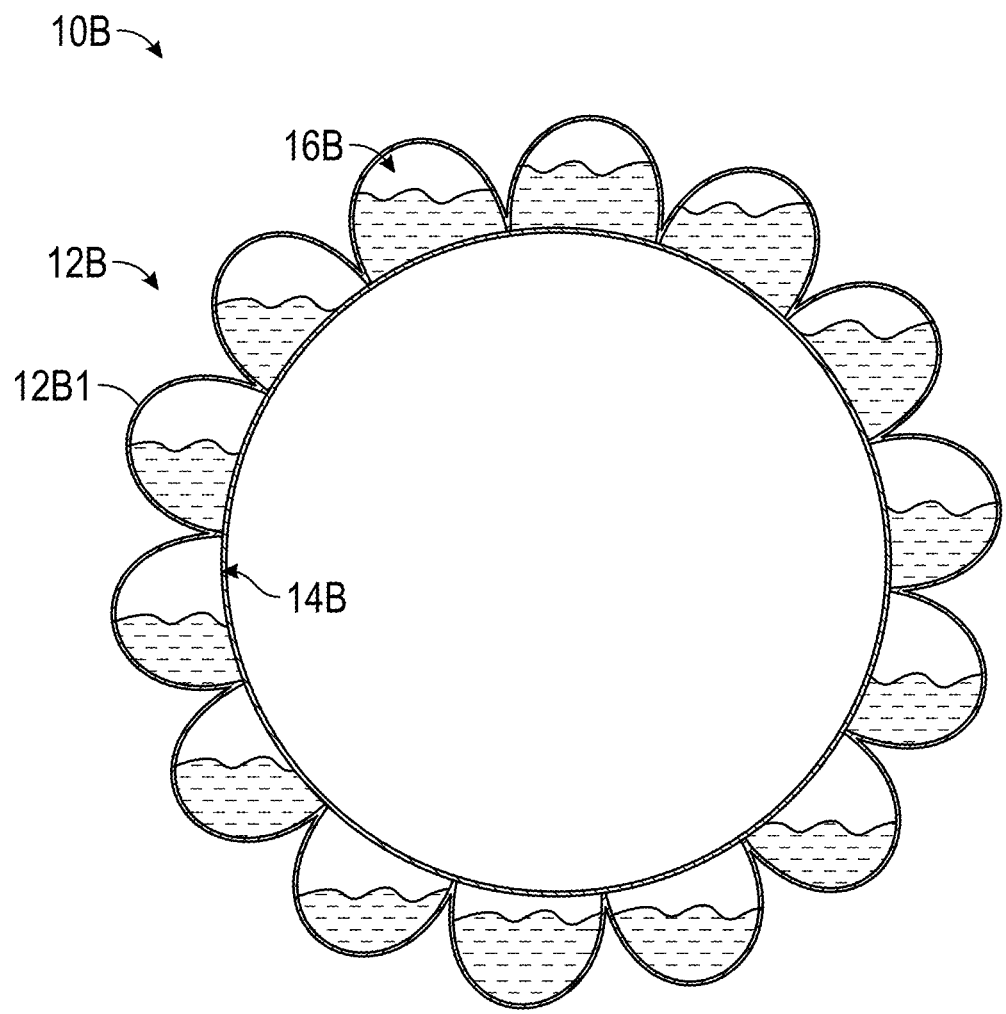
FIG. 15 is a schematic cross-sectional view of another implementation of a tube assembly of the system of FIG. 7 along a plane transverse to an axis of the tube assembly.

FIG. 15 shows a cross-section transverse to a central axis of a tube assembly 10B. The tube assembly 10B is similar to the tube assembly 10A in FIGS. 7-13. Thus, reference numerals used to designate the various features of the tube assembly 10B are identical to those used for identifying the corresponding features of the tube assembly 10A in FIGS. 7-13, except that a "B" instead of an "A" has been added to the numerical identifier. Therefore, the structure and description for the various features of the tube assembly 10A and how it's operated and controlled in FIGS. 7-13 are understood to also apply to the corresponding features of the tube assembly 10B in FIG. 15, except as described below. The tube assembly 10B can be implemented in a receiver system similar to the receiver system 100, 100A, except as described below.

The tube assembly 10B differs from the tube assembly 10A in that the outer tube 12B includes multiple channels 12B1 or subsections arranged circumferentially about and attached (e.g., welded) to the inner tube 14B, the channels 12B1 extending along the length of the tube assembly 10B. In the illustrated implementation, the channels 12B1 or subsections have a curved wall. In the illustrated implementation, the receiver assembly that includes multiple tube assemblies 10B excludes an air system (e.g., like the air system 70A in FIG. 7). Also, in the illustrated implementation, the inner tube 14B rotates along with the outer tube 12B about the central axis of the inner tube 14B. Each of the channels 12B 1 receives particles in a cavity 16B (e.g., passageway, flowpath), and the particles pass along the length of the tube assembly 10B between an inlet (e.g., similar to inlet 20A) of the tube assembly 10B to an outlet (e.g., similar to the outlet 30A) of the tube assembly 10B. Each of the channels 12B1 advantageously turns the particles over as the tube assembly 10B rotates or spins about its axis, thereby increasing mixing and the heat transfer coefficient of the particles. The channels 12B 1 allow the segmentation of the particles. Thus, the particles are not only sheared through gravity as they pass through the tube assemblies 10B, but also swirl within the channels 12B1 or segments, keeping high contact with a hot wall of the outer tube 12B that acts as an additional fin.

As with the tube assemblies 10, the tube assembly 10B can be angled relative to a horizontal plane to facilitate movement (under gravity) of the particles along the length of the tube assembly 10B.

Figure 16A:
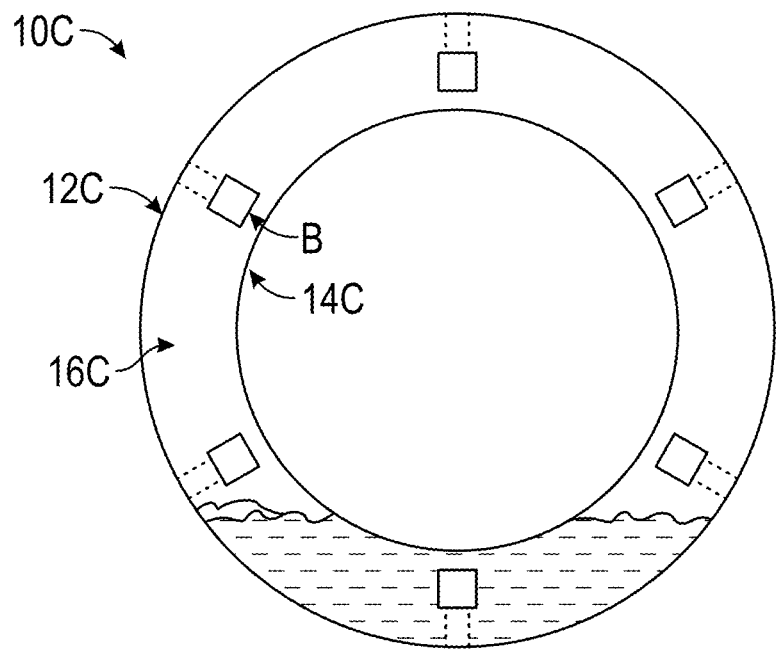
FIG. 16A is a schematic cross-sectional view of another implementation of a tube assembly of the system of FIG. 7 along a plane transverse to an axis of the tube assembly.
Figure 16B:
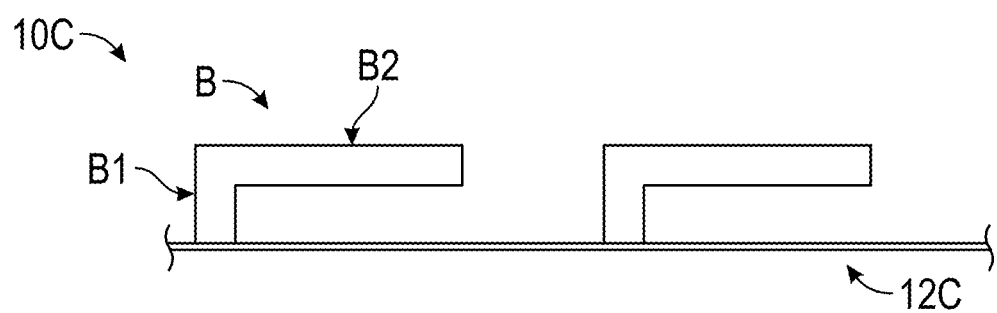
FIG. 16B is a schematic partial cross-sectional view of the tube assembly of FIG. 16A along a length direction of the tube assembly.

FIGS. 16A-16B shows a cross-section transverse to a central axis of a tube assembly 10C. The tube assembly 10C is similar to the tube assembly 10A in FIGS. 7-13. Thus, reference numerals used to designate the various features of the tube assembly 10C are identical to those used for identifying the corresponding features of the tube assembly 10A in FIGS. 7-13, except that a "C" instead of an "A" has been added to the numerical identifier. Therefore, the structure and description for the various features of the tube assembly 10A and how it's operated and controlled in FIGS. 7-13 are understood to also apply to the corresponding features of the tube assembly 10C in FIGS. 16A-16B, except as described below. The tube assembly 10C can be implemented in a receiver system similar to the receiver system 100, 100A, except as described below.

The tube assembly 10C differs from the tube assembly 10A in that one or more (e.g., multiple) fins B are attached to an inner surface of the outer tube 12C and extend into the annulus 16C (e.g., passageway, flowpath). The fins B can have an L-shape with a first portion B1 attached to the wall of the outer tube 12C and a second portion B2 extending at an angle (e.g., perpendicular) to the first portion B1. The fins B are advantageously shaped to facilitate thermal expansion thereof (e.g. by having a first portion B1 that is smaller or shorter than the second portion B2). In one implementation, the receiver assembly that includes multiple tube assemblies 10C excludes an air system (e.g., like the air system 70A in FIGS. 7-13). In another implementation, the receiver assembly that includes the multiple tube assemblies 10C can include an air system (e.g. similar to the air system 70A in FIGS. 7-13). The outer tube 12C and the fins B attached to the outer tube 12C rotate relative to the inner tube 14C and advantageously mechanically mix the particles in the annulus 16C (e.g., mechanically fluidize the particles). Also, heat can be conducted via the fins B from the irradiated outer surface of the outer tube 12C to the particles. The fins B can thus advantageously increase the mixing and heat transfer coefficient of the particles in the annulus 16C. The fins B sweep and disturb and shear the particles near the wall of the outer tube 12C, mixing the hottest wall-contacting particles with cooler particles away from the wall of the outer tube 12C. As with the tube assemblies 10, in some implementations the tube assembly 10C can be angled relative to a horizontal plane to facilitate movement (under gravity) of the particles along the length of the tube assembly 10C.

Figure 17:
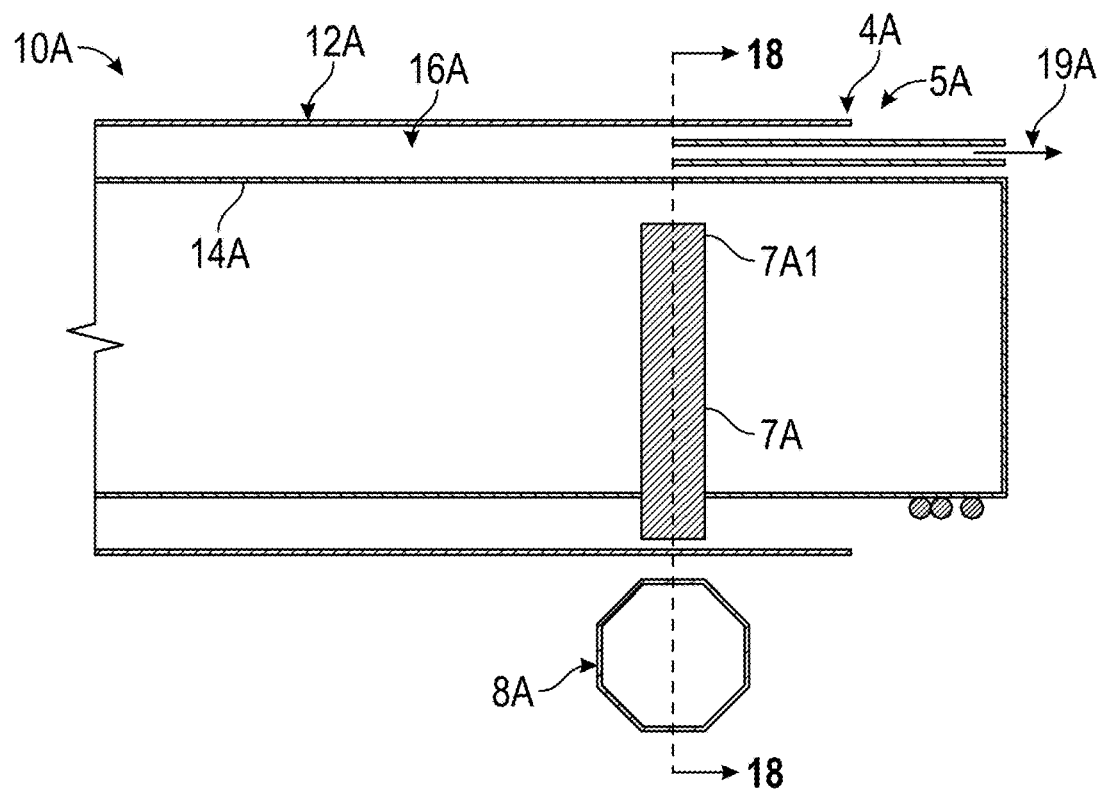
FIG. 17 is a schematic cross-sectional view of an outlet end portion of a tube assembly of the system in FIG. 7 along a length direction of the tube assembly.
Figure 18:
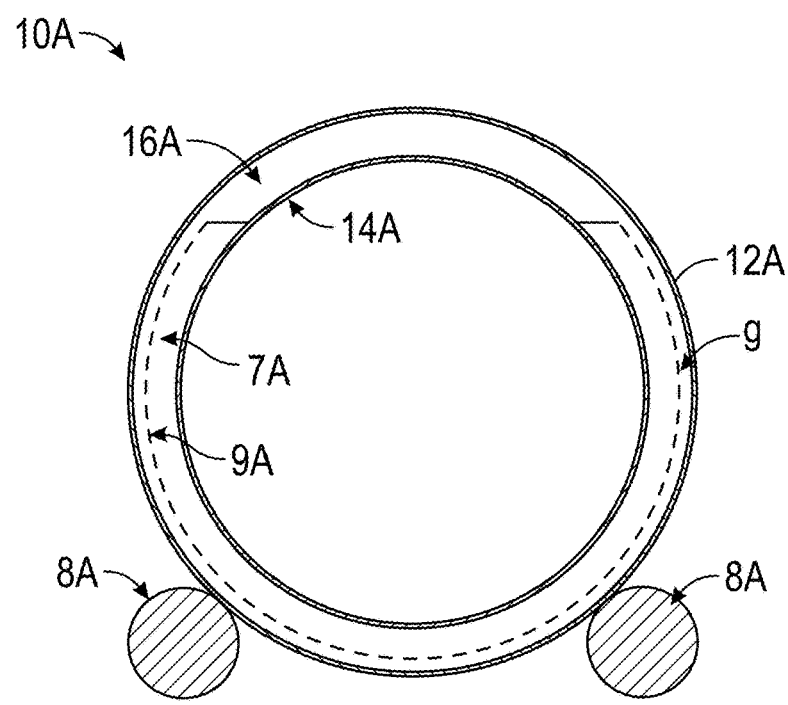
FIG. 18 is a schematic cross-sectional view of an outlet portion of the tube assembly of the system in FIG. 7 along a plane transverse to a longitudinal axis of the tube assembly.

FIGS. 17-18 show one example of a distal portion 4A of a tube assembly 10A of the receiver system 100A. As discussed above, the outer tube 12A at the distal portion 4A can be supported on one or more rollers 8A, which advantageously allows for the thermal expansion of the outer tube 12A (e.g., for the outer tube 12A to expand lengthwise or slide relative to the inner tube 14A) due to the solar flux received by the outer tube 12A, significantly reducing stresses due to differential thermal expansion. A seal 7A (e.g., a leaky seal) can extend from the inner tube 14A into the annulus 16A to an outer edge 9A of the seal 7A that is spaced from the outer wall 12A by a gap g (e.g., which allows the outer tube 14A to spin or rotate relative to the inner tube 14A). As shown in FIG. 18, the seal 7A can extend circumferentially around most but not all of the inner tube 14A and extends to an upper edge 7A1. In one example, the gap g can have a dimension (width) of about 5 to 7 times the diameter of a particle. In another example, the gap g can have a dimension (width) of at least 3 times the diameter of a particle. For example, where the particle diameter is 200-300 µm, the gap g can have a dimension of about 1000-2100 µm. The gap g allows some of the particles to pass therethrough as they move toward the outlet 5A, with a majority (e.g., most) of the particles passing over the upper edge 7A1 of the seal 7A. The seal 7A controls the flow of particles out of the tube assembly 10A. As discussed above, in one example, the air 19A can exit the tube assembly 10A and pass to a cyclone separator, after which the air is returned to the proximal portion 2A of the tube assembly 10A. In another example, the air 19A is exhaust to the environment.

In one implementation, the irradiated (e.g., heated) particles exit (e.g., slip out of) the tube assembly 10A (e.g., exit the annulus 16A) to a collection bin. In one implementation, the particles are directed to a thermal energy storage that can then be used for one or more industrial processes (e.g., generate electricity, generate steam, facilitate a chemical process, etc.).

Figure 19:
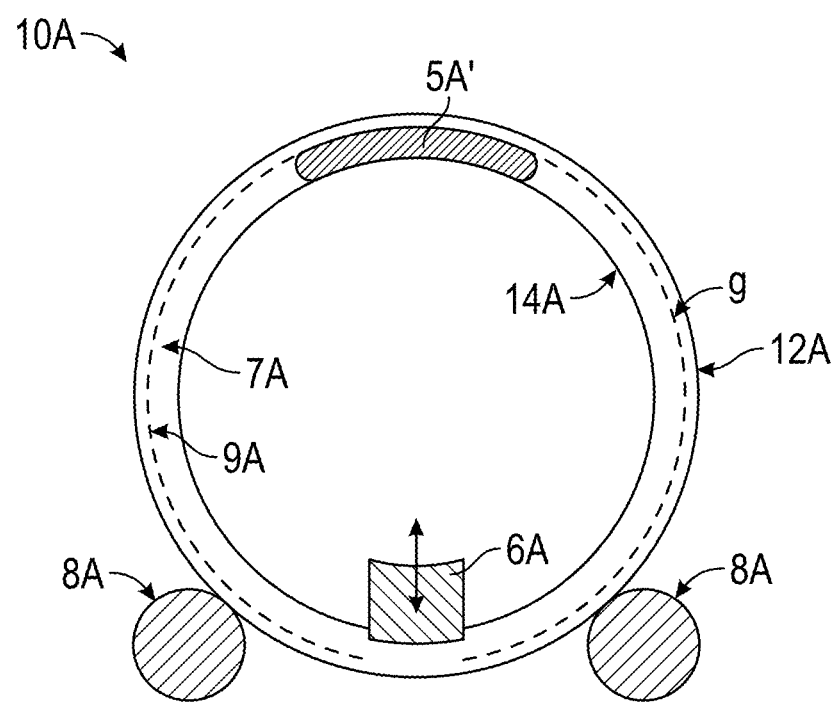
FIG. 19 is a schematic cross-sectional view of an outlet portion of another implementation of the tube assembly of the system in FIG. 7 along a plane transverse to a longitudinal axis of the tube assembly.

FIG. 19 shows a variation of the structure in FIGS. 17-18. In the illustrated embodiment, the seal 7A extends circumferentially around an entirety of the inner tube 14B except for a portion at the bottom in which a gate valve 6A is selectively actuatable to block and unblock the annulus 16A at that location to disallow and allow, respectively, particles to pass therethrough. As described above, some of the particles will pass out of the tube assembly 10A via the gap g. Air can exit via outlet 5A'.

Figure 20:
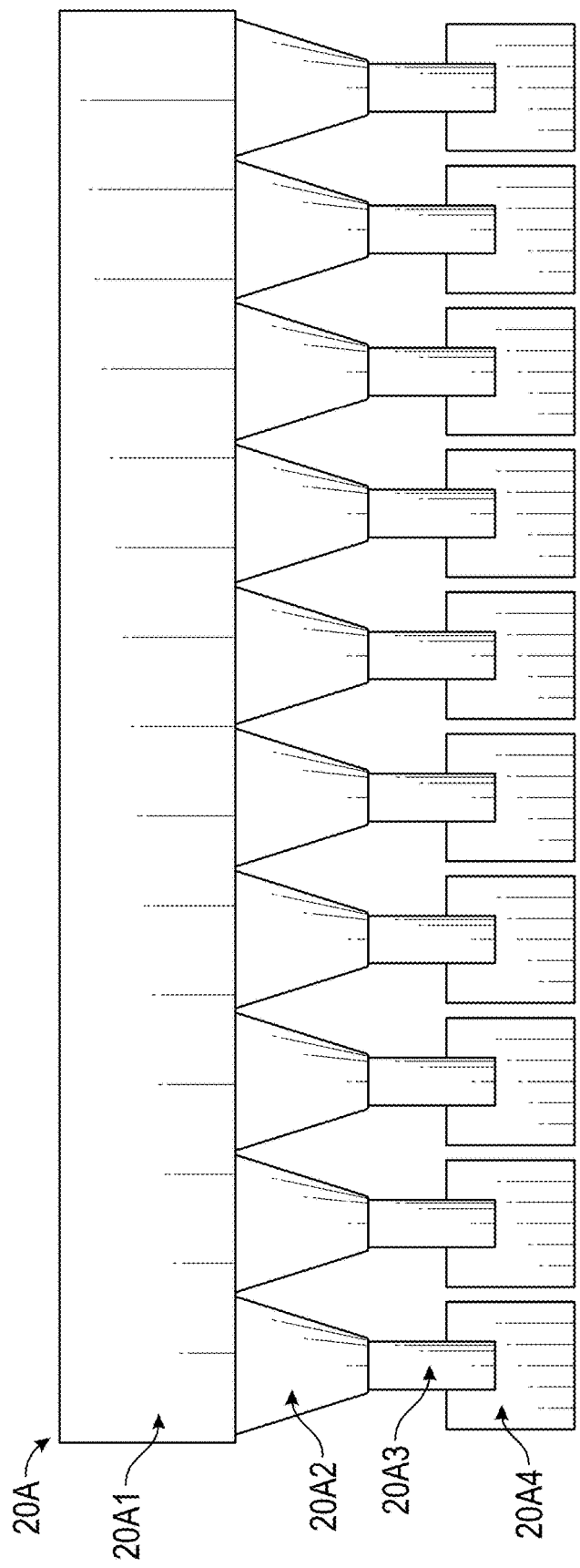
FIG. 20 is a schematic end view of an inlet assembly to the receiver system of FIG. 7.
Figure 21:
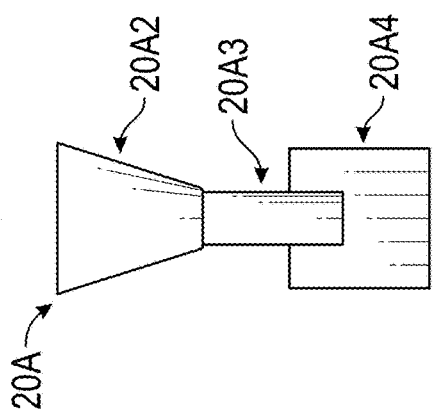
FIG. 21 is a schematic side view of the inlet assembly of FIG. 20.

FIGS. 20 and 21 show views of an example of an inlet 20A of the receiver system 100A. The inlet 20A can include a header or manifold 20A1 that receives particles. A set of funnels 20A2 can connect to the header 20A1 to direct particles to respective chutes 20A3 to a receiving area 20A4 from which particles are conveyed (e.g., via conveyor 28A) to each of the tube assemblies 10A. Therefore the header or manifold 20A1 distributes the particles to a conveyor for each tube assembly 10A. This passive design enables particle distribution while avoiding piling and ratholing concerns.

Figure 22:
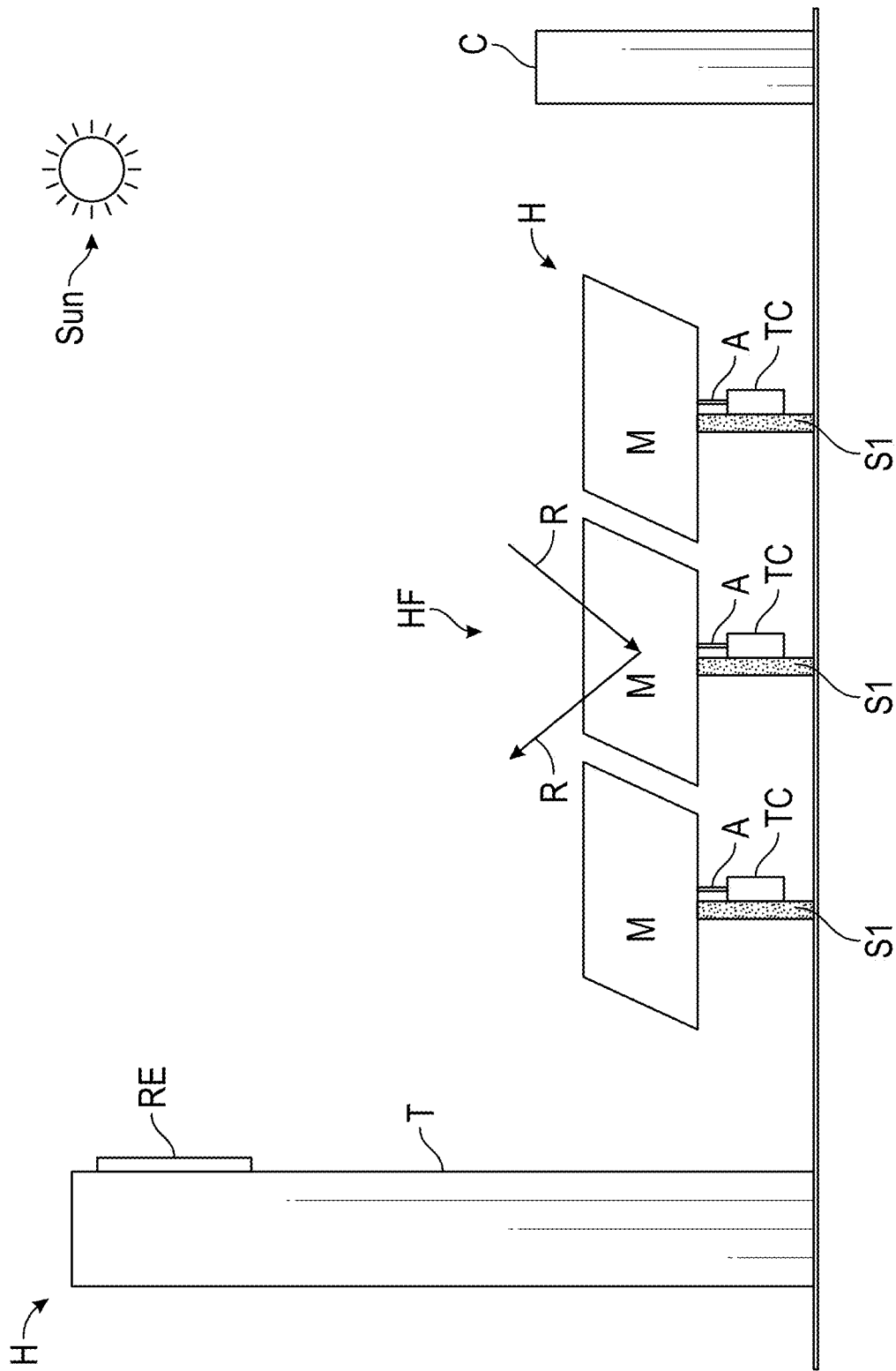
FIG. 22 is a schematic view of a receiver tower and heliostats that direct reflected sunlight toward the receiver tower.

The receiver system 100, 100A can be located on a roof of a building and exposed to sunlight (e.g., reflected sunlight) directed from below the tube assemblies 10, 10A, 10B, 10C (e.g., in a manner that captures 80-90% of sunlight onto the tube assemblies 10, 10A, 10B, 10C). FIG. 22 shows one example of a concentrated solar power (CSP) system that can be used with the receiver system 100, 100A disclosed herein. The CSP system can include a heliostat field HF with one or more heliostats H supported on shafts or frames S 1. Each heliostat H can have a tracking controller TC and an actuator A and a mirror M. The mirrors M can reflect sunlight to one or more receiver apertures RE (e.g., similar to receiver apertures O) in a tower T. The tower T can have a housing H at the top thereof that houses the receiver system 100, 100A. A controller C can control the heliostat field HF (e.g., control the heliostats H).

Figure 23:
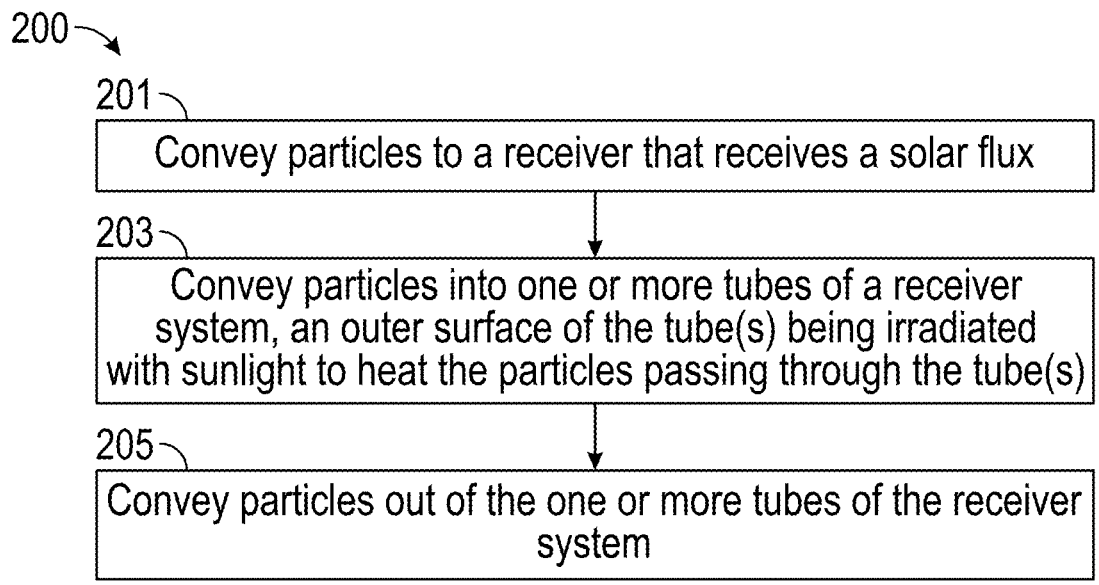
FIG. 23 is a flowchart of a method for operating a receiver system for heating particles that pass through the receiver.

FIG. 23 shows a process or method 200 for operating a receiver system (e.g., like the receiver system 100, 100A). The method 200 includes the step 201 of conveying particles to a receiver that receives a solar flux (e.g., that receives concentrated solar energy). The method 200 also includes the step 203 of conveying particles into one or more tubes of the receiver system, an outer surface of the tubes being irradiated with sunlight to heat the particles passing through the tubes. The method 200 also includes the step 205 of conveying the particles out of the one or more tubes of the receiver system. In one example, the irradiated particles are directed to a thermal energy storage that can then be used for one or more industrial processes (e.g., generate electricity, generate steam, facilitate a chemical process, etc.).

Advantageously, by increasing the heat transfer coefficient in the rotating receiver, the receiver (e.g., receiver system 100, 100A) can operate at higher fluxes and temperatures as a result of lower thermal gradients within the walls (e.g., of the tubes). The particles are kept near the hot outer wall of the outer tube (12A, 12B, 12C) with a "pipe-in-pipe" design that creates an annular space for the particles to reside. Additionally, the pipe-in-pipe or tube-in-tube arrangement described above allows the inner pipe, which is at the cooler, particle temperature, to be the primary structural support of the whole span of the tube assembly 10, 10A for the receiver system. This also allows the inner pipe or tube to be made of a less expensive material.

Additional Embodiments

In embodiments of the present disclosure, a particle receiver system may be in accordance with any of the following clauses:

Clause 1: A particle receiver, comprising:
an inlet;
an outlet; and
a plurality of tubes rotatably coupled to the inlet and the outlet and configured to receive a plurality of particles via the inlet, the particles passing along a passageway of each of the tubes to the outlet, the particles dispensed via the outlet, the tubes configured to receive solar energy on an outer surface thereof to heat the particles passing through the tubes.

Clause 2: The particle receiver of clause 1, wherein the tubes are rotatably coupled to the inlet and the outlet by roller bearings.

Clause 3: The particle receiver any preceding clause, wherein the tubes are angled relative to a horizontal plane so that a proximal end of the tubes is at a higher elevation than a distal end of the tubes, and so that the particles pass through the tubes under a force of gravity.

Clause 4: The particle receiver of any preceding clause, wherein the inlet is an inlet manifold.

Clause 5: The particle receiver of any preceding clause, wherein the outlet is an outlet manifold.

Clause 6: The particle receiver of any preceding clause, wherein each of the plurality of tubes includes an outer tube and an inner tube, the outer tube configured to rotate relative to the inner tube, an annulus defined between the inner tube and the outer tube, the particles configured to flow through the annulus between a proximal portion and a distal portion of the plurality of tubes.

Clause 7: The particle receiver of clause 6, further comprising multiple fins that extend into the annulus from the outer tube, the outer tube and fins configured to rotate relative to the inner tube so that the fins mix the particles in the annulus.

Clause 8: The particle receiver of clause 6 or 7, further comprising an air system operable to flow air into the annulus to facilitate mixing of the particles in the annulus.

Clause 9: The particle receiver of any of clauses 1-5, wherein each of the plurality of tubes includes an outer tube and an inner tube, the outer tube defining a plurality of channels attached to the inner tube and defining respective cavities between the outer tube and the inner tube, the particles configured to flow through the respective cavities of the plurality of channels between a proximal portion and a distal portion of the plurality of tubes.

Clause 10: A particle receiver, comprising:
an inlet;
an outlet; and
a plurality of tube assemblies, each tube assembly comprising an inner tube fixed to the inlet and to the outlet and an outer tube rotatably coupled to the inlet and the outlet and disposed about the inner tube, the tube assembly configured to receive a plurality of particles via the inlet, the particles passing along a passageway between the inner tube and the outer tube to the outlet, the particles dispensed via the outlet, the outer tube being made of metal and configured to receive solar energy on an outer surface thereof to heat the particles passing through the tube assembly.

Clause 11: The particle receiver of clause 10, wherein the outer tube is rotatably coupled to the inlet and the outlet by roller bearings.

Clause 12: The particle receiver of any of clauses 10-11, wherein the plurality of tube assemblies are arranged in parallel.

Clause 13: The particle receiver of any of clauses 10-12, wherein the inner tube is made of a different material than the outer tube.

Clause 14: The particle receiver of any of clauses 10-13, wherein the passageway is an annulus between the inner tube and the outer tube that extends along a length of the tube assembly, the outer tube configured to rotate relative to the inner tube.

Clause 15: The particle receiver of any of clauses 10-13, wherein the passageway is a plurality of separate cavities defined by a plurality of channels of the outer tube attached to the inner tube and extending along a length of the tube assembly.

Clause 16: The particle receiver of any of clauses 10-14, further comprising one or more fins attached to the outer tube and extending into the passageway, the one or more fins configured to mix the particles as they pass through the passageway.

Clause 17: The particle receiver of any of clauses 10-14 and 16, further comprising one more air inlet apertures in a wall of the inner tube via which air enters the passageway between the inner tube and the outer tube to facilitate mixing of the particles.

Clause 18: The particle receiver of any of clauses 10-14 and 16-17, further comprising a leaky seal attached to an outer surface of the inner tube and disposed in the passageway between the inner tube and the outer tube at a distal portion of the tube assembly.

Clause 19: The particle receiver of any preceding claim, wherein a distal portion of the outer tube is supported on one or more rollers.

Clause 20: The particle receiver of any of clauses 10-14 and 16-18, further comprising a gate valve selectively actuatable to restrict flow of the particles in the passageway.

Clause 21: The particle receiver of any of clauses 10-20, further comprising a conveyor configured to convey the particles between the inlet and the passageway.

Clause 22: The particle receiver of clause 21, wherein the conveyor extends at an angle relative to an axis of the tube assembly.

Clause 23: The particle receiver of any of clauses 10-22, wherein the tube assembly is angled relative to a horizontal plane so that a proximal end of the tube assembly is at a higher elevation than a distal end of the tube assembly, and so that the particles pass through the tube assemblies under a force of gravity.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A particle receiver, comprising:
    an inlet;
    an outlet; and
    a plurality of tubes rotatably coupled to the inlet and the outlet and configured to receive a flow of a plurality of particles via the inlet, after being delivered into each of the plurality of tubes the particles flowing along a passageway of each of the tubes to the outlet solely due to a force of gravity, the particles dispensed via the outlet, the tubes configured to receive solar energy on an outer surface thereof to heat the particles passing through the tubes, wherein each of the plurality of tubes includes an outer tube and an inner tube, the outer tube configured to rotate relative to the inner tube, an annulus defined between the inner tube and the outer tube, the particles configured to flow through the annulus between a proximal portion and a distal portion of the plurality of tubes.

2. The particle receiver of claim 1, wherein the tubes are rotatably coupled to the inlet and the outlet by roller bearings so that the tubes rotate at a speed of between 30 rpm and 200 rpm.

3. The particle receiver of claim 1, wherein the tubes are angled relative to a horizontal plane so that a proximal end of the tubes is at a higher elevation than a distal end of the tubes, and so that the particles pass through the tubes under a force of gravity.

4. The particle receiver of claim 1, wherein the inlet is an inlet manifold.

5. The particle receiver of claim 4, wherein the outlet is an outlet manifold.

6. The particle receiver of claim 1, further comprising multiple fins that extend into the annulus from the outer tube, the outer tube and fins configured to rotate relative to the inner tube so that the fins mix the particles in the annulus.

7. The particle receiver of claim 1, further comprising an air system operable to flow air into the annulus to facilitate mixing of the particles in the annulus.

8. The particle receiver of claim 1, the outer tube defining a plurality of channels attached to the inner tube and defining respective cavities between the outer tube and the inner tube, the particles configured to flow through the respective cavities of the plurality of channels between the proximal portion and the distal portion of the plurality of tubes.

9. A particle receiver, comprising:
    an inlet;
    an outlet; and
    a plurality of tube assemblies, each tube assembly comprising an inner tube fixed to the inlet and to the outlet and an outer tube rotatably coupled to the inlet and the outlet and disposed about the inner tube, the tube assembly configured to receive a flow of a plurality of particles via the inlet, after being delivered into each tube assembly the particles passing along a passageway between the inner tube and the outer tube to the outlet solely due to a force of gravity, the particles dispensed via the outlet, the outer tube being made of metal and configured to receive solar energy on an outer surface thereof to heat the particles passing through the tube assembly, wherein the passageway is an annulus between the inner tube and the outer tube that extends along a length of the tube assembly, the outer tube configured to rotate relative to the inner tube.

10. The particle receiver of claim 9, wherein the outer tube is rotatably coupled to the inlet and the outlet by roller bearings.

11. The particle receiver of claim 9, wherein the plurality of tube assemblies are arranged in parallel to allow parallel flow therethrough.

12. The particle receiver of claim 9, wherein the inner tube is made of a different material than the outer tube.

13. The particle receiver of claim 9, wherein the passageway is a plurality of separate cavities defined by a plurality of channels of the outer tube attached to the inner tube and extending along a length of the tube assembly.

14. The particle receiver of claim 9, further comprising one or more fins attached to the outer tube and extending into the passageway, the one or more fins configured to mix the particles as they pass through the passageway.

15. The particle receiver of claim 9, further comprising a leaky seal attached to an outer surface of the inner tube and disposed in the passageway between the inner tube and the outer tube at a distal portion of the tube assembly.

16. The particle receiver of claim 9, wherein a distal portion of the outer tube is supported on one or more rollers.

17. The particle receiver of claim 9, further comprising a gate valve selectively actuatable to restrict flow of the particles in the passageway.

18. The particle receiver of claim 9, further comprising a conveyor configured to convey the particles between the inlet and the passageway.

19. The particle receiver of claim 18, wherein the conveyor extends at an angle relative to an axis of the tube assembly.

20. The particle receiver of claim 9, wherein the tube assembly is angled relative to a horizontal plane so that a proximal end of the tube assembly is at a higher elevation than a distal end of the tube assembly, and so that the particles pass through the tube assemblies under a force of gravity.

21. A particle receiver, comprising:
an inlet;
an outlet; and
a plurality of tube assemblies, each tube assembly comprising an inner tube fixed to the inlet and to the outlet and an outer tube rotatably coupled to the inlet and the outlet and disposed about the inner tube, the tube assembly configured to receive a flow of a plurality of particles via the inlet, after being delivered into each tube assembly the particles passing along a passageway between the inner tube and the outer tube to the outlet solely due to a force of gravity, the particles dispensed via the outlet, the outer tube being made of metal and configured to receive solar energy on an outer surface thereof to heat the particles passing through the tube assembly, the inner tube comprising one or more air inlet apertures in a wall of the inner tube via which air enters the passageway between the inner tube and the outer tube to facilitate mixing of the particles.

* * * * *